United States Patent
Ito et al.

(10) Patent No.: US 6,404,455 B1
(45) Date of Patent: Jun. 11, 2002

(54) METHOD FOR TRACKING ENTERING OBJECT AND APPARATUS FOR TRACKING AND MONITORING ENTERING OBJECT

(75) Inventors: Wataru Ito, Koganei; Hirotada Ueda, Kokubunji; Toshimichi Okada, Zama; Miyuki Endo, Tachikawa, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/078,521

(22) Filed: May 14, 1998

(30) Foreign Application Priority Data

May 14, 1997 (JP) .............................. 9-124329
Aug. 22, 1997 (JP) ............................. 9-226153

(51) Int. Cl.$^7$ ............................................. H04N 5/225
(52) U.S. Cl. ....................... 348/169; 382/219; 382/218; 382/103
(58) Field of Search ................................ 348/169, 214, 348/152, 143, 155, 15, 36, 44, 172, 135; 382/219, 218, 103

(56) References Cited

U.S. PATENT DOCUMENTS

| | | | |
|---|---|---|---|
| 5,134,472 A | | 7/1992 | Abe |
| 5,164,827 A | * | 11/1992 | Paff ............................ 348/143 |
| 5,243,418 A | * | 9/1993 | Kuno et al. ................... 348/155 |
| 5,280,530 A | * | 1/1994 | Trew et al. ................... 348/169 |
| 5,384,588 A | * | 1/1995 | Martin et al. ................... 348/15 |
| 5,570,177 A | * | 10/1996 | Parker et al. ................ 348/169 |
| 5,917,553 A | * | 6/1999 | Honey et al. ................ 348/157 |
| 6,108,033 A | * | 8/2000 | Ito et al. ...................... 348/152 |

FOREIGN PATENT DOCUMENTS

| | | |
|---|---|---|
| JP | 59137944 | 1/1986 |
| JP | 63277162 | 5/1990 |

\* cited by examiner

*Primary Examiner*—Chris Kelley
*Assistant Examiner*—Shawn S. An
(74) *Attorney, Agent, or Firm*—Antonelli, Terry, Stout & Kraus, LLP

(57) ABSTRACT

A system for processing a tracking picture of an intruding object includes a first TV camera for outputting a video signal used for detecting the intruding object, a second TV camera for outputting a video signal used for monitoring a magnified tracking picture of the intruding object, and a picture processing device for processing and operating on the video signal inputted from the first TV camera and outputting a rotation control signal and a zooming control signal. The system detects a difference between the video signal inputted from the first TV camera and a reference background video signal, and a change of a detecting state from the change of the numbers of objects detected in the continuous input video signal.

31 Claims, 19 Drawing Sheets

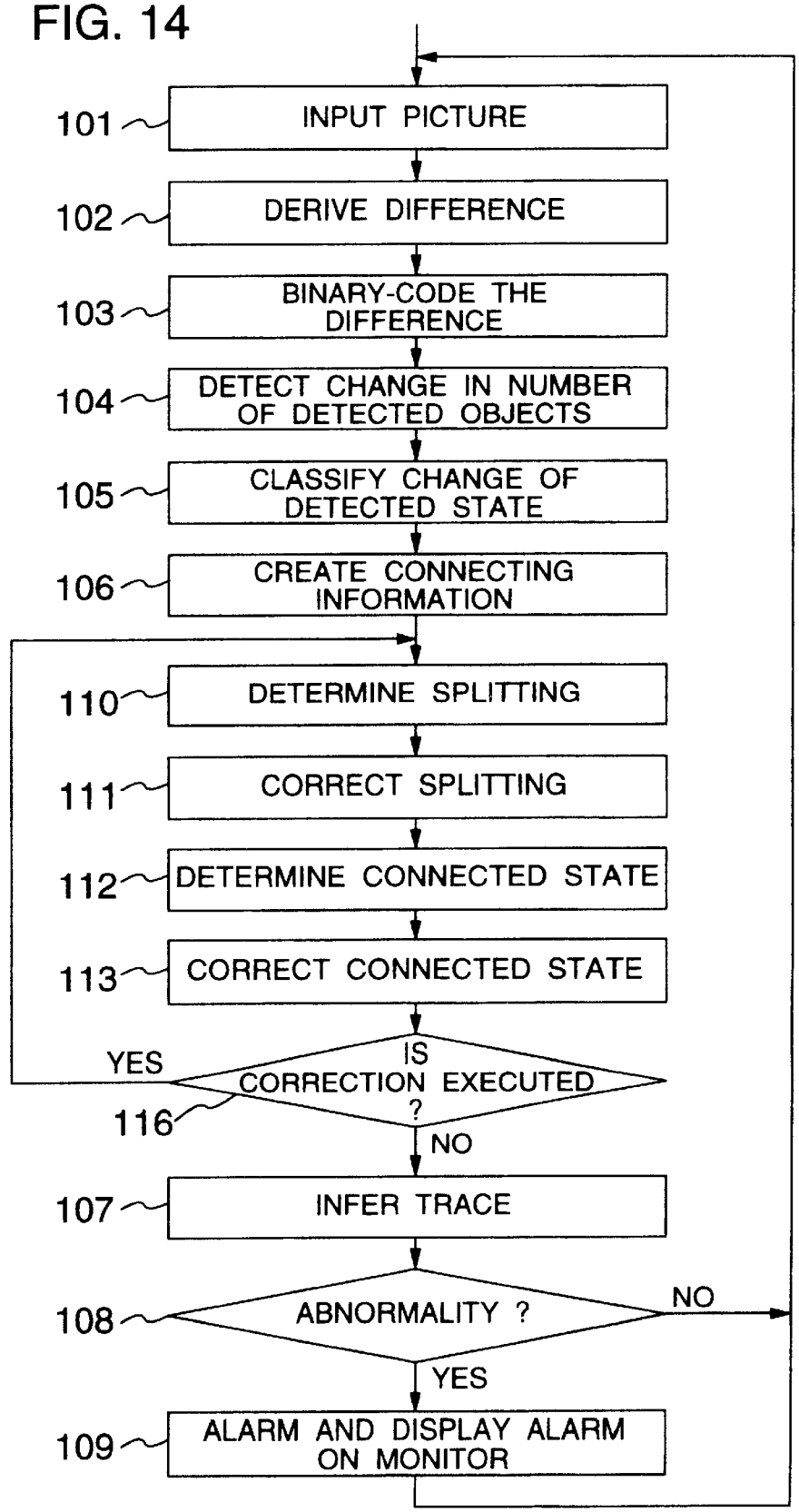

OBJECT

| DETECTION TIME |
|---|
| DETECTED STATE |
| DETECTION LOCATION, AREA, PIXEL PATTERN |
| DETERMINED TRACE |
| SET OF POINTERS TO OBJECT |

METHOD FOR TRACKING ENTERING OBJECT AND APPARATUS FOR TRACKING AND MONITORING ENTERING OBJECT

BACKGROUND OF THE INVENTION

The present invention relates to a monitoring apparatus provided with a TV camera and more particularly to a method for tracking an object and an apparatus for tracking and monitoring an object which are both arranged to automatically detect one or more objects entering or intruding in a field of view of a TV camera from a video signal sent from the TV camera and to track movement of the detected object(s) or magnify the object(s) on a TV monitor.

A manually operated picture monitoring apparatus arranged to use a TV camera has been prevailing in the past. In recent years, however, in place of monitoring the object on the monitor by a person, the type of monitoring system has been demanded which automatically detects a moving object such as a person or a vehicle entering a monitoring field of view from a video signal and display the object in magnified representation or give a certain notice or an alarm.

To detect a moving object or an entering object, a conventional system has been arranged to compare an input video signal obtained from the TV camera and a reference background video signal, that is, a video signal that does not contain an object to be detected, derive a difference of a brightness value at each pixel between both of the video signals, and detect an area with a large difference as an object. This system is called the difference method, which has been widely used. The application of this system is described in U.S. patent application Ser. No. 08/646,018 filed on May 7, 1996 (corresponding to the European Application No.963033030 filed on May 13, 1996). Another application of the tracking system with the difference method is discussed in the thesis entitled "A procedure for the Analysis of Skiers' Movement with Image Processing Techniques", Vol. 43, No. 12, pp. 1370 to 1374 of "Proceedings of TV Society" issued on December, 1989.

One of plausible methods arranged to automatically detect an entering object from a video signal obtained from a TV camera, track the entering object and magnify it on a video monitor screen for the purpose of facilitating the monitor of the entering object is to detect the entering object by successively switching the video signals outputted from a plurality of TV cameras. However, this method disadvantageously involves many TV cameras and a video signal switcher and a controller therefor so that this method makes the overall system larger in scale.

For decreasing the necessary number of TV cameras for the purpose of reducing the system scale, the system is required to widen a field of view of an imaging lens provided in each TV camera. This system however makes the entering object appear on the monitor in a small size. For example, if the entering object is a person, this system may have difficulty in discriminating the lineaments of the entering person.

Further, when an object having a luminance value close to the background picture is to be detected by the difference method, a part of the object may be lost undetected or the object may be split into a plurality of pieces, resulting in detecting the object as a plurality of objects. If one object within a field of view is detected as a plurality of objects, therefore, the method for tracking an object using the difference method may determine that the same number of objects as the detected member of the objects exist and track the plurality of the objects though in actuality just one object exists within the field of view. Further, the tracking method using the difference method detects objects that are seemingly connected together and looks as one object as one object. In a case that, therefore, a plurality of objects exist within the field of view, if these objects are connected together at a certain point in time, this type of method determines that there exists only one object at the time and hence track them as one object though in actuality two or more objects exist within the field of view. Moreover, since the tracking method using the difference method involves no comparison of shapes of a picture nor no comparison of picture patterns, if two or more objects are located within the field of view, this method can not reliably guarantee that the same object is being tracked.

SUMMARY OF THE INVENTION

It is an object of the present invention to provide a picture processing system for tracking an entering object by automatically detecting the entering object and magnifying the detected entering object, for allowing an observer to more easily make sure of the entering object on a video monitor screen.

In carrying out the object, a picture processing system for tracking an entering object according to an aspect of the invention includes a camera or a TV camera with an imaging lens of a wide field for outputting a video signal used for detecting the entering object, another camera or TV camera with a zoom lens for outputting a video signal used for monitoring the picture as tracking the entering object, the camera being mounted on an electric pan and tilt head or pan head, and a picture processing device for processing and operating a video signal inputted from the camera provided with the lens of the wide field and outputting a rotation control signal for rotating the electric pan and tilt head by a necessary amount of angle, wherein the object entering the predetermined monitoring area is automatically tracked and picked up. Here, the camera or TV camera provided with the imaging lens of a wide field is a camera or a TV camera which is capable of imaging the whole of the picture within the object tracking and monitoring area. The whole of the object tracking/monitoring area is referred to as the wide field or field of view.

A system for processing a tracking picture of an entering object according to another aspect of the invention includes a camera or a TV camera with a lens of a wide field for outputting a video signal used for detecting the entering object, another camera or TV camera with a zoom lens for outputting a video signal used for monitoring a magnified picture as tracking the entering object, the camera being mounted on an electric pan and tilt head, a picture processing device for processing and operating the video signal sent from the camera with the lens of the wide field and outputting a rotation control signal for rotating the electric pan and tilt head by a necessary amount of angle and a zooming control signal for zooming the zoom lens by a necessary amount, wherein the object entering the predetermined monitoring area is automatically tracked and picked up.

Preferably, the picture processing device in the system includes a picture memory for storing a video signal sent from the camera with the lens of the wide field and a processed signal of the video signal, a CPU (central processing unit) for carrying out processing, operation, control and management performed in the picture processing device, a program memory for storing a program for operating the CPU, a working memory for storing data for analyzing data obtained by processing a locational coordinate and a movement history of the detected entering object, and a pan and tilt head control unit for outputting the rotation control signal for rotating the electric pan and tilt head by a necessary amount of angle and the zooming control signal for zooming the zoom lens by a necessary amount based on the operated data.

Preferably, the picture memory provided in the picture processing device includes an input picture memory for storing an inputted video signal, a background picture memory for storing a background video signal used for detecting the entering object, two working memories for storing the background video signal and the input video signal for use in carrying out an operation of detecting a difference between the pictures, a picture memory for storing an inter-picture operation result obtained by detecting and operating a difference between the background picture and the input picture, and a binary-coded picture memory for storing a binary-coded video signal obtained by operating the detected picture difference.

A system for processing a tracking picture of an entering object according to an embodiment of the invention is arranged to process picture information inputted from a camera or a TV camera having a lens of a wide field into a picture processing device and detect the entering object, and rotate an electric pan and tilt head having a camera or a TV camera with the zoom lens mounted thereon toward the entering object from the location information and the size information of the detected entering object as well as control the zooming of the zoom lens, for allowing an observer of the monitor to easily determine the entering object.

It is a further object of the present invention to provide a highly reliable apparatus for tracking and monitoring an object which is arranged to determine if splitting of one object has occurred or if a plurality of objects exist, although they are merged or connected as one object.

It is a yet further object of the present invention to provide an apparatus for tracking and monitoring an object which is arranged to infer a precise location of one object even if splitting has occurred in detecting the one object and infer a precise location of each of a plurality of objects even if merging or connection has occurred in detecting the plurality of objects so as to make it possible to detect a tracking path of each object.

It is another object of the present invention to provide an apparatus for tracking and monitoring an object which is arranged to correct a tracking path of each object from the detecting state before and after the time of the detection and to precisely track the object if splitting has occurred in defecting one object or merging or connection has occurred in detecting a plurality of objects.

It is another object of the present invention to provide an apparatus for tracking and monitoring an object which is arranged to guarantee that the same object is being tracked even if two or more objects are located within a target field of view.

In achieving the foregoing objects, according to another aspect of the invention, a change in the number of detected objects is detected and splitting or connection of the object or objects is detected from a change in detecting state.

According to still another aspect of the invention, the method for tracking and monitoring an object includes the steps of detecting an object contained in an input video signal, detecting the change in the number of detected objects other continuous frames, classifying a change of a detecting state of the objects from the detected change in the number of the detected objects, and determining if the detected objects are split from one object or the detected one object is made up of plural objects connected together based on the classified state change of the objects.

An object tracking and monitoring method according to an embodiment of the invention includes the steps of creating connecting information for representing a locational change of an object detected at each time and a change in a detected area from the change of the detecting state and inferring a trace of the object by estimating the locational change of the object within a variable length of time, for realizing more precise object tracking by tracking the detected object and estimating the locational change of the detected object within a long length of time.

According to another aspect of the invention, an object tracking and monitoring method includes the steps of determining if splitting of one object occurs when the object is detected from the aforementioned connecting information and correcting plural areas of the split parts as one area if it is determined that splitting has occurred in the object, whereby the split parts are corrected as one object even when one object is detected as a plurality of objects due to splitting which has temporally occurred in detecting the object.

According to another aspect of the invention, an object tracking and monitoring method includes the steps of determining if merging or connection of a plurality of objects into one object has occurred in object detection from the aforementioned connecting information and correcting the connection of the plural objects from the connecting information before and after the detection if the object is determined to be connected, whereby the plural objects can be detected as plural objects even if they are temporarily detected as one object.

According to another aspect of the invention, an object tracking and monitoring method includes the recursive determining step of determining if the split parts are corrected as one object at the aforementioned step of correcting the split parts, for recursively correcting the split parts as one object. At this step, if one object is detected as the split parts, those parts are more precisely corrected as one object.

According to another aspect of the invention, an object tracking and monitoring method includes the recursive determining step of determining if one object is corrected as the connection of plural objects at the aforementioned step of correcting the connection, for recursively correcting the connected objects as individual objects. At this step, if the connected objects are detected as one object, the object is more precisely corrected as individual objects.

According to another aspect of the invention, an object tracking and monitoring method includes the steps of keeping also as the connecting information the pixel pattern of the detected area together with the location of the detected object and the area of the detected area given at the aforementioned step of creating the connecting information, matching the pixel pattern of the detected area to the pixel pattern kept at the step of determining the connection, for the purposes of determining if the object is a connected one, tracking the detected object, and guaranteeing that the same object is being tracked if plural objects are located in the field of view.

According to another aspect of the invention, an object tracking and monitoring apparatus includes a camera or a TV camera for imaging a field of view to be monitored, a picture input interface for converting a signal from the camera into a video signal, and a processing unit including at least a CPU, a picture memory, a working memory and a program memory, for processing the video signal. The apparatus executes the operations of detecting a difference of a luminance value at each pixel between an input video signal from the camera and a reference background video signal with no object to be detected; detecting the region with a large difference as an object; classifying the change of the detecting state from a change in the number of the detected objects contained over the continuous input video signals; storing as the connecting information a location of the detected object at each time, an area of the detected region and a picture pattern of the detected object, wherein the location, the region and the picture pattern are derived from the change of the detecting state; correcting the detected location of an object if splitting has occurred in detecting the object and correcting the trace of the objects if merging or connection of the objects has occurred in detecting the objects.

BRIEF DESCRIPTION OF THE DRAWINGS

FIG. 14 is a flowchart showing a method for tracking an object according to another embodiment of the invention;

FIGS. 21A and 21B are explanatory views showing a connecting status of an object after the connected objects are corrected as individual objects;

DESCRIPTION OF THE PREFERRED EMBODIMENTS

Before describing the embodiments of the invention, the processing of the difference method will be described with reference to FIGS. 6 and 7A to 7C.

Figure 6:
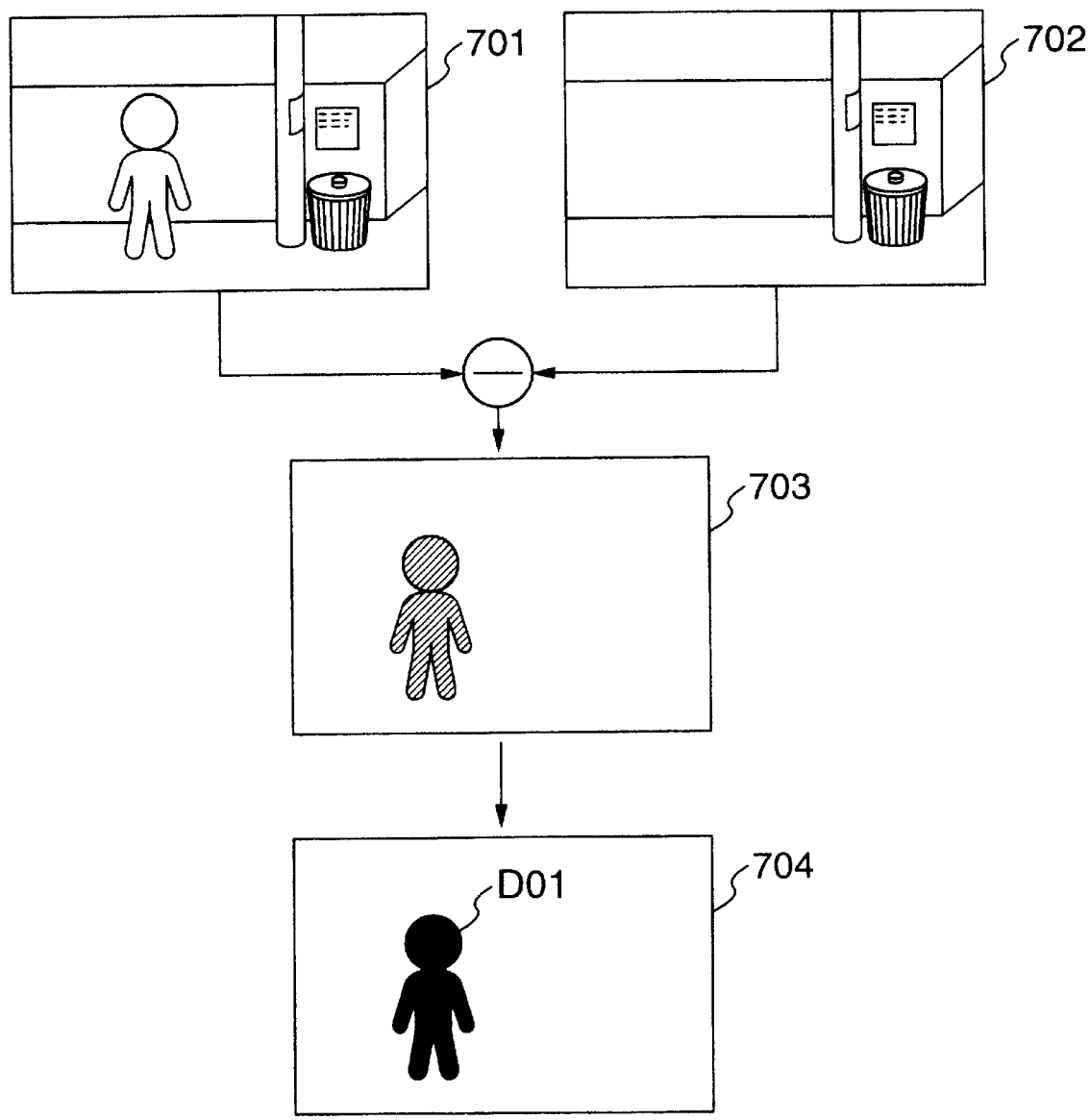
FIG. 6 is an explanatory view showing the principle of operation of detecting an object based on the difference method.

As shown in FIG. 6, an operation is executed to calculate a difference of each pixel between an input picture 701 and a reference background picture 702 for obtaining a difference picture 703. Then, the difference picture 703 is converted into a binarized image 704. The conversion is executed on the assumption that the pixels whose values are less than a given threshold value are "0" and the pixels whose values are larger than or equal to the given threshold value are "255" (assuming that one pixel consists of eight bits). This conversion allows a human like object appearing on the input picture 701 to be detected as an picture D01 in the binarized image 704.

Figure 7A:
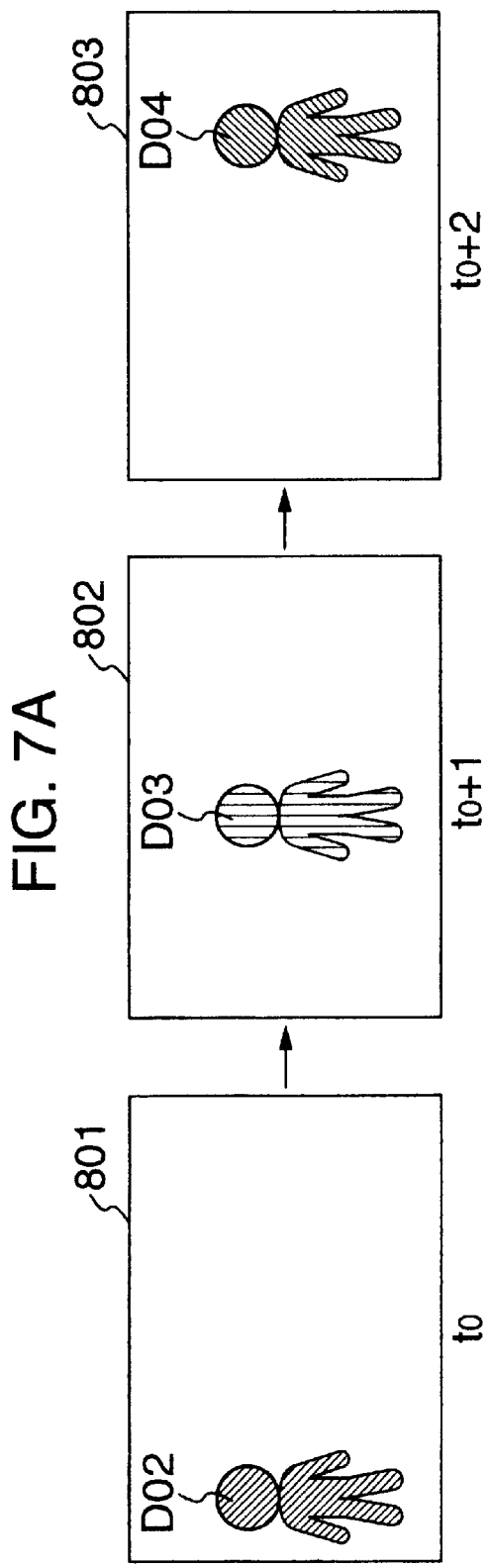
FIGS. 7A to 7C are explanatory views showing the principle of operation of tracking a detected object.
Figure 7C:
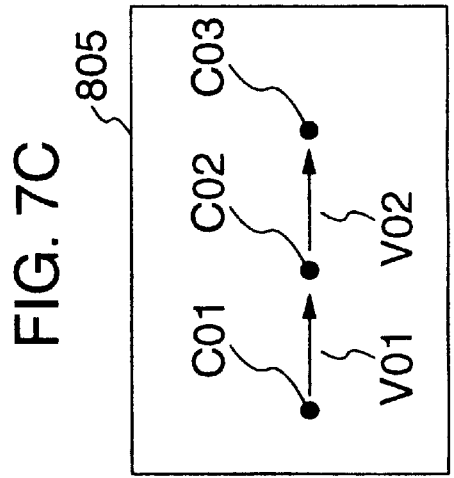
Figure 7B:
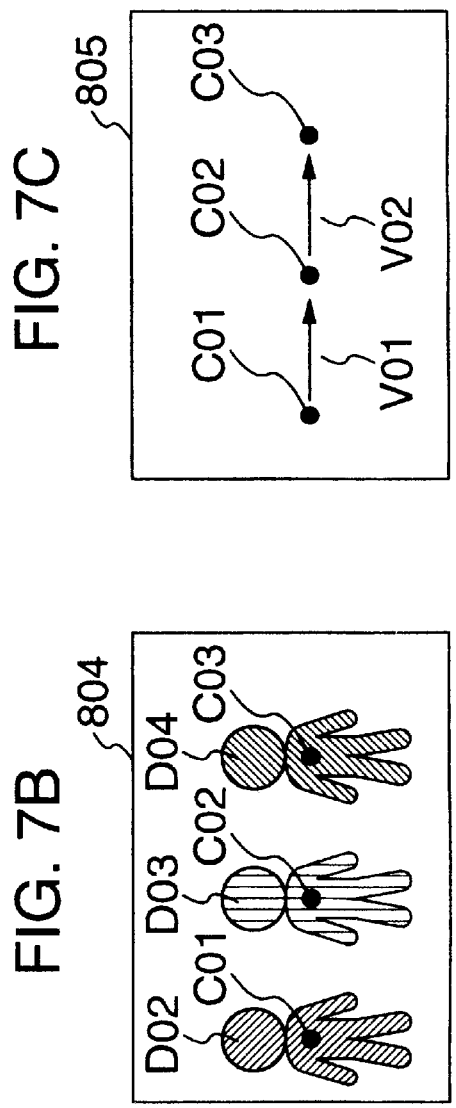

The automatic tracking of the detected object is executed by sequentially detecting the object by the difference method and obtaining the movement of the object on the location of the detected object on the picture at each time. Then, description will be oriented to the principle of operation of the automatic tracking with reference to FIGS. 7A–7C. In FIGS. 7A to 7C, a numeral 801 denotes a binarized image at the time $t_0$. A numeral 802 denotes a binarized image at the time $t_0+1$. A numeral 803 denotes a binarized image at the time $t_0+2$. A numeral 804 denotes a picture where all the detected objects and the centers of gravity of the binarized images 801, 802 and 803 are represented at a time for the description's sake. A numeral 805 denotes a picture where the centers of gravity of the detected objects appearing on the picture 804 are represented by dots. When the object is detected at the locations D02, D03 and D04 of the binarized images 801, 802 and 803 obtained at the times $t_0$, $t_0+1$ and $t_0+2$ shown in FIG. 7A, the movement of this object may be represented by arrows V01 and V02 shown in FIG. 7C, wherein the arrow V01 connects the centers of gravity C01 and C02 of the detected object locations D02 and D03 at their times, appearing on the picture 804 shown in FIG. 7B, and the arrow V02 connects the centers of gravity C02 and C03 of the detected object locations D02 and D03 at their times.

The center of gravity may be derived by the expression (1). The center of gravity C is defined by:

$$C=(\hat{X}, \hat{Y})$$

$$\hat{X} = \frac{1}{[B]} \sum_{(X,Y) \in B} X, \quad \hat{Y} = \frac{1}{[B]} \sum_{(X,Y) \in B} Y \quad \text{Expression (1)}$$

$$B=\{(X, Y)|f(X, Y)=255\}$$

where f(x, y) is a binarized image of a difference (assuming that the pixels whose values are more than or equal to the threshold value are "255" and the pixels whose values are less than the threshold value are "0") and [B] is the number of pixels, satisfying the relation B={(x, Y)|f(X,Y)=255}.

Hereafter, description will be oriented to the embodiments of the invention with reference to the relevant drawings.

Figure 1:
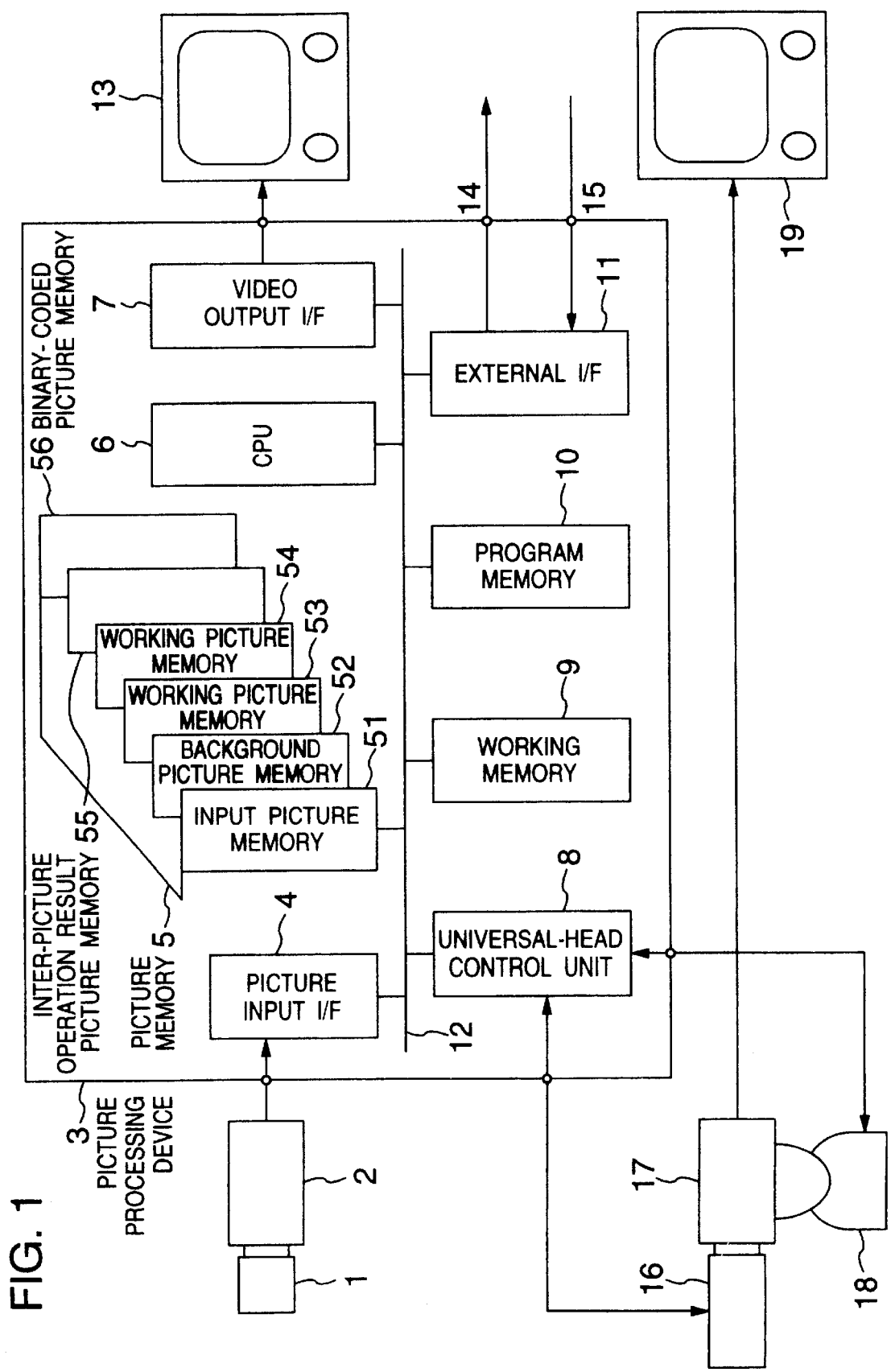
FIG. 1 is a block diagram showing a system for processing a tracking picture of an entering object according to an embodiment of the present invention.
Figure 2A:
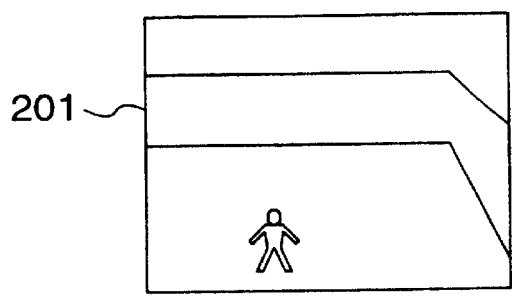
FIGS. 2A and 2B are views showing monitor screens useful in explaining the system for processing a tracking picture of an entering object according to the invention.
Figure 2B:
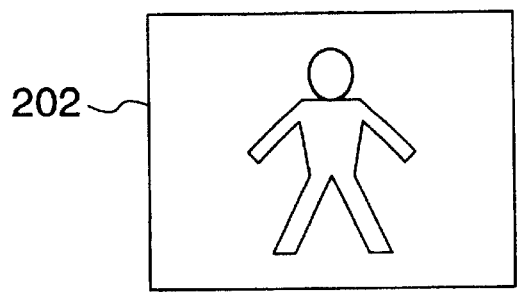

FIG. 1 is a block diagram showing an image processing system for tracking an entering object according to an embodiment of the invention. FIGS. 2A and 2B are explanatory views showing pictures imaged by the TV cameras whose imaging view fields are different from each other.

The system for processing a tracking picture of an entering object is made up of a TV camera 2 provided with an imaging lens 1 for obtaining a picture in a wide view field, a TV camera 17 provided with a zoom lens 16 for obtaining a magnified picture, the TV camera 17 being mounted on an electric pan and tilt head 18, a picture processing device 3 for detecting an entering object and outputting a magnified picture by processing an inputted video signal in the wide view field, and video monitors 13 and 19 for monitoring the pictures whose imaging view fields are different from each other.

In the system shown in FIG. 1, the TV camera 2 provided with the imaging lens 1 for outputting the picture in the wide view field operates to feed a video signal of the wide view field as shown in FIG. 2A, for example, which is imaged at a necessary monitoring spot, to the picture processing device 3. The video signal is for detecting the entering object.

The TV camera 17 provided with a zoom lens 16 is mounted on the electric pan and tilt head 18 which enables the camera 17 to rotate vertically and horizontally. The picture processing device 3 operates to control an amount of angle in the vertical and the horizontal directions and an amount of zooming. The device 3 outputs a video signal of a magnified picture shown in FIG. 2B, which represents an entering object imaged at a necessary monitoring spot, to a video monitor 19.

The image processing device 3 operates to detect an entering object from the video signal of the wide view field inputted from the TV camera 2 provided with the imaging lens 1 and computes a locational coordinate of the entering object on the imaged picture.

Further, the picture processing device 3 operates to convert the locational coordinate of the entering object detected from the video signal of the wide view field into the vertical and horizontal rotation of the electric pan and tilt head 18 for controlling the pan and tilt head 18.

The TV camera 17 provided with the imaging lens 16, mounted on the electric pan and tilt head 18 rotated toward the entering object, operates to output the video signal of a magnified picture of the entering object to the video monitor 19. Hence, the observer can constantly monitor the magnified intruded object on the video monitor 19.

By monitoring the magnified entering object on the video monitor 19, the observer can clearly make sure of a countenance and a shape of the entering object, which cannot be clearly discriminated from the picture of the wide field of view on the video monitor 13.

Next, description will be oriented to the circuit composing the picture processing device 3 and its operation.

The TV camera 2 provided with the imaging lens 1 for obtaining the picture of the wide view field operates to apply the video signal to the picture processing device 3.

In the picture processing device 3, the video signal is inputted to a picture input interface (I/F) 4 for converting the analog video signal into a digital signal having 256 gradations ranging from 0 to 255. The digital signal is applied from the interface 4 to a data bus 12.

A picture memory 5 is connected to the data bus 12. The picture memory 5 has a memory capacity for storing six pictures. Concretely, the picture memory 5 contains an input picture memory 51 for storing an input video signal, a background picture memory for storing a background video signal used for detecting an entering object, working picture memories 53 and 54 for storing the background video signal and the input video signal for carrying out an operation of detecting a difference between the pictures, an inter-picture operation result picture memory 55 for storing the result of a predetermined operation for detecting the difference between the pictures, and a binary-coded picture memory 56 for storing a binary-coded video signal representing the predetermined operation result binary-coded.

Further, the data bus 12 contains a central processing unit (CPU) 6, a program memory 10, a working memory 9, a pan and tilt head control unit 8, an external interface (I/F) 11, and a video output interface (I/F) 7 connected thereto. The CPU 6 operates to execute operation, control, management and so forth. The working memory 9 analyzes data such as the locational coordinate and a movement history (moving trace) of the detected entering object, the data being obtained by processing the video signal. The pan and tilt head control unit 8 operates to output a rotation control signal for rotating the electric pan and tilt head by a required amount of angle and also output a zooming control signal for controlling the zooming of the imaging lens 16 by a required amount according to the size of the entering object so as to obtain a desired sized picture of the entering object under the control of the CPU 6 which operats a moving amount of the pan and tilt head from the locational coordinate of the detected entering object. The external I/F 11 operates to take an interface with an external apparatuses with respects to inputting/outputting of an alarming signal, a measurement start signal, a control signal and so forth when an entering object is detected. The video output I/F 7 operates to convert the digital video signal into an analog video signal and then output the analog video signal.

Figure 3A:
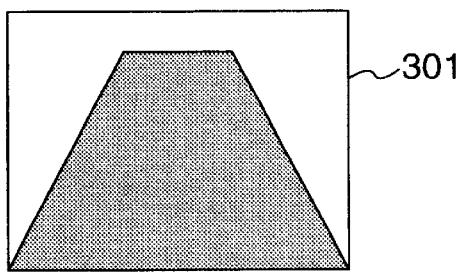
FIGS. 3A to 3G are views showing monitor screens useful in explaining the system for processing a tracking picture of an entering object according to the invention.
Figure 3B:
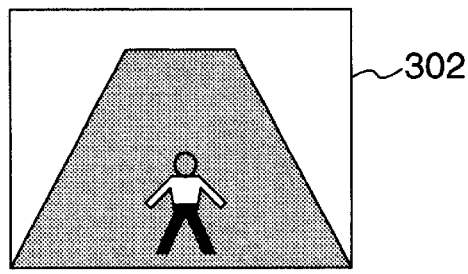
Figure 3C:
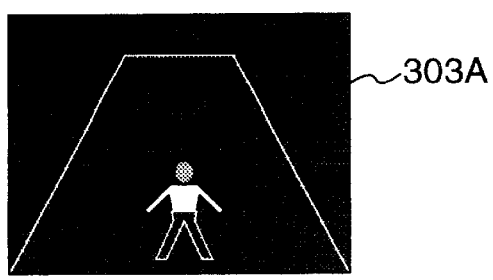
Figure 3D:
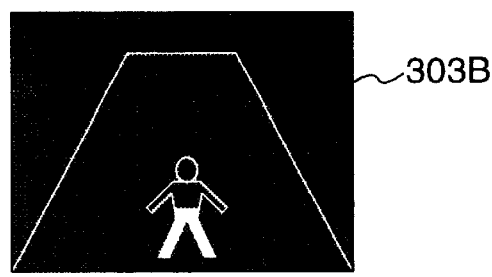
Figure 3E:
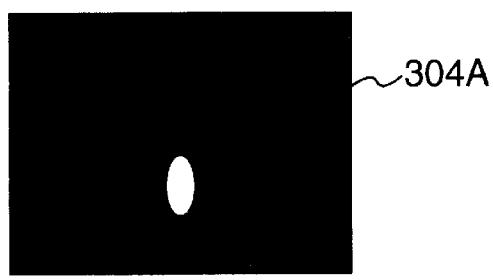
Figure 3F:
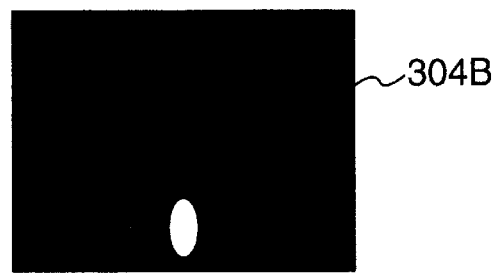
Figure 3G:
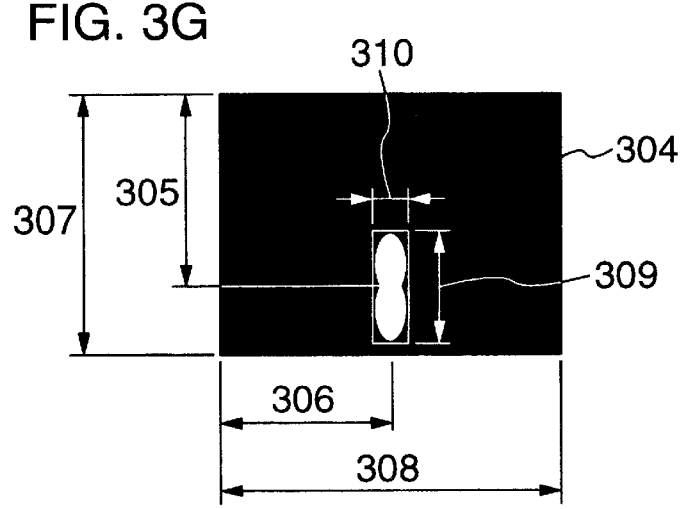
Figure 4:
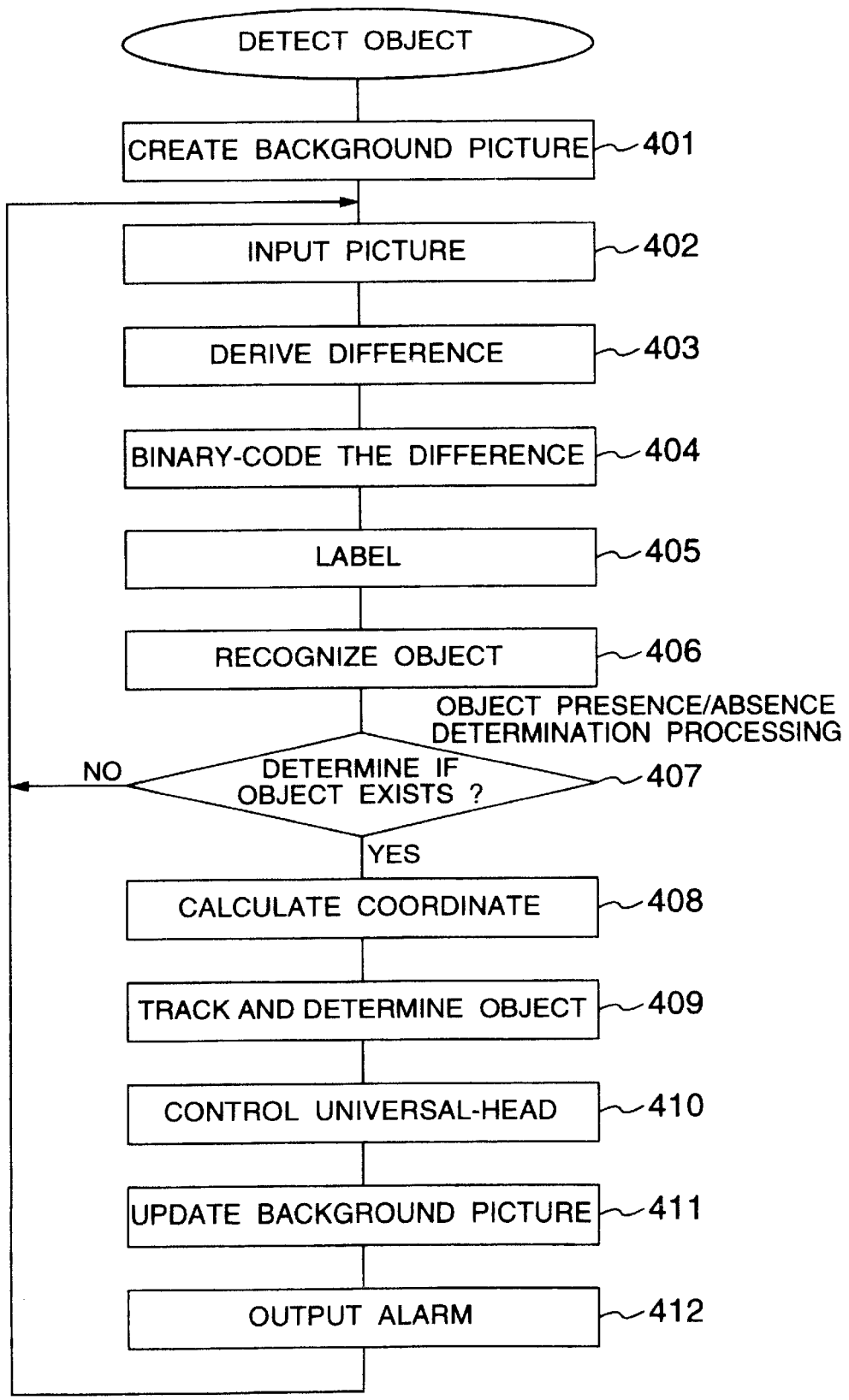
FIG. 4 is a flowchart showing a procedure of the system for processing a tracking picture of an entering object according to the invention.

For describing a system for processing a tracking picture of an entering object according to the embodiment of the invention, FIGS. 3A to 3G show the monitor screens and FIG. 4 is a flowchart showing a procedure. Now, the procedure will be described.

A process 401 of creating a background picture is executed to store in the background picture memory 52 the video signal of the wide field with no entering object at a necessary monitoring spot fed by the TV camera 2 at given intervals of frame, perform a weighted means operation about the stored video signal, create a picture having no entering object as shown in FIG. 3A or having a negligible object, that is, a background picture 301, and store the background video signal.

A process 402 of inputting a picture is executed to apply a picture of the wide field at a necessary monitoring spot fed by the TV camera 2, concretely, a video signal of the input picture 302 as shown in FIG. 3B into the input picture memory 51 through the picture input I/F 4.

A difference process 403 is executed to derive a difference picture for calculating a level difference between the video signals stored in the background picture memory 52 and the picture memory 51.

The content of the input picture memory 51 is copied into the working picture memory 53 and the content of the background picture memory 52 is copied into the working picture memory 54. Then, the operation is executed to obtain a difference between the contents of the memories 53 and 54, that is, (picture memory 53)–(picture memory 54) and apply the operated result into the picture memory 55. The operated result represents a bright-part difference picture 303A as shown in FIG. 3C. With this difference, a picture of a brighter portion such as a white upper clothing, than the background picture can be obtained. Next, the difference of (picture memory 54)–(picture memory 53) is obtained and then is put into the picture memory 53. The difference represents a dark-part difference picture 303B as shown in FIG. 3D. With this difference, a picture of a darker portion, such as black trousouses, than the background picture can be obtained.

The thus selected bright-part difference picture 303A is copied into the working picture memory 54.

A binary-coding process 404 is executed to binary-code the bright-part difference picture stored in the picture memory 54 and the dark-part difference picture stored in the picture memory 53, respectively, put the binary-coded bright-part difference picture into the picture memory 54 and the binary-coded dark-part difference picture into the picture memory 53 again. As a result, the binary-coded bright-part image 304A as shown in FIG. 3E and the binary-coded dark-part image 304B as shown in FIG. 3F are obtained. The binary-coded bright-part image stored in the picture memory 54 and the binary-coded dark-part image stored in the picture memory 53 are logical-summed pixel by pixel and then the result of the logical-summing is applied into the digital picture memory 56. The result of the logical-summing corresponds to the binary-coded image 304 to be estimated as shown in FIG. 3G. The binary-coded image shown in FIG. 3G represents an entering object as a block of white pixels.

A labelling process 405 is executed to detect if a block of white pixels is contained in the binary-coded video signal read from the binary-coded picture memory 56 by means of the labelling technique known in the field of this art and then measure the number of blocks of white pixels. In addition, the labelling method is described, for example, in Tamura Hideyuki, et al. "Introduction to Computer Picture Processing" Souken Shuppan, Ltd., 1987, pages 75 to 76.

A process 406 of recognizing an object is executed to measure a size, that is, the widths in the X and the Y directions 309 and 310 of each block of white pixels determined by the labelling process 405, as shown in FIG. 3G, compare the block of white blocks with the outside range of a preset entering object such as a person or a vehicle in size, recognize the entering object to be detected, and store the location of the detected entering object on the picture memory and the size data (for example, the Y-directional width 309 and the X-directional width 310) in the working memory 9.

A process 407 of determining if the object exists is branched depending on absence or presence of the entering object determined on the data stored in the working memory 9.

If it is determined that there exists an extering object to be detected at the process 407, a process 408 of calculating a coordinate is executed to calculate a locational coordinate of a center of gravity of the object stured in the working memory 9, for example, the coordinate in the Y direction 305 and the coordinate in the X direction 306 as shown in FIG. 3G and put the number of objects and the locational coordinate of the center of gravity of each object into the working memory 9. In addition, the locational coordinate of the detected object to be stored may be, for example, the center of a circumscribed square of an area occupied by the detected object, other than the center of gravity.

If there exist two or more objects to be detected, a process 409 of tracking and determining the object is executed to collate the locational coordinate of the center of gravity and the size of each object of the present input picture in light of the locational coordinate of the center of the gravity and the size of each object of the present input picture mow stored in the working memory 9, the locational coordinate of the center of gravity and the size of each object stored in the previous processing in the working memory 9 and a moving speed of the each object stored in the working memory 9 in the previous processing. And, in order to associate each object in the present input picture with a corresponding object stored in the work memory 9 in the previous processing, the corresponding object is selected from those objects that have been stored in the work memory 9 in the previous processing. This process is repeated until all the objects are associated with corresponding ones.

A process 410 of control the electric pan and tilt head is executed to convert the locational coordinate of the center of gravity of the object of the input picture into the absolute location data of the electric pan and tilt head 18 and calculate a difference between the current location of the electric pan and tilt head 18 and the object and then enable the pan and tilt head control unit 8 to output the rotation control signal to the electric pan and tile head 18 so that the electric pan and tile head 18 may rotate in the proper direction by this difference.

Then, a process 411 of updating the background picture is executed to add the input picture to the created background picture by means of the weighted mean operation expression shown in the following (2) for creating the updated background picture.

Updated Background Picture=Background Picture×Weighting Coefficient+Input Picture×(1−Weighting Coefficient)  (2)

The weighting coefficient shown in the expression (2) is used for taking a change of the input picture against the background picture obtained up to now and updating the background picture. Reducing the weighting coefficient makes the follow-up characteristic of the background picture against the input picture more excellent. On the other hand, reducing the weighting coefficient too much would cause undesirable effects such as noise. For this reason, it is necessary to set an appropriate value. For example, 62/64≈0.96875 may be used as the weighting coefficient.

As a method for updating the background picture other than the foregoing process for updating the background picture, another method may be employed wherein the picture having no entering object is recognized for updating the background picture.

A process 412 of outputting an alarm is executed to output an alarm signal to an external device through the external I/F 11 after detecting the entering object and issue an alarm to the observer.

Figure 5A:
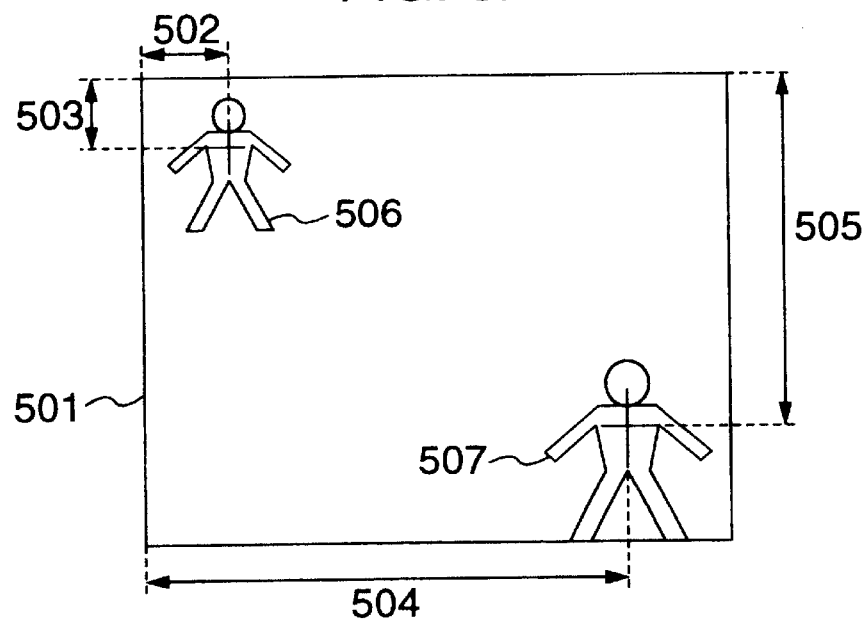
FIGS. 5A to 5C are views showing monitor screens useful in explaining the system for processing a tracking picture of an entering object according to the invention.
Figure 5B:
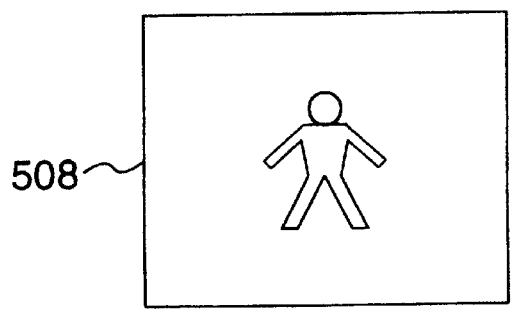
Figure 5C:
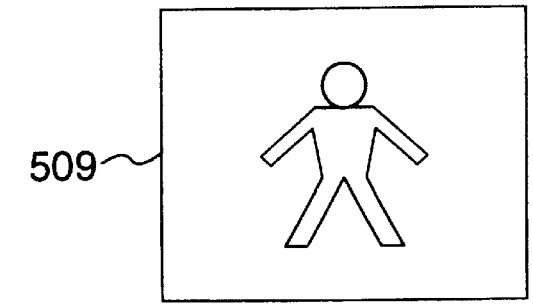

Now, description will be oriented to the process of calculating the locational coordinate of the object of the detected picture and the pan and tilt head control data used in the process 410 with reference to FIGS. 5A to 5C.

If a person 506 is entering at the upper left corner of the screen as shown in the detected picture 501 shown in FIG. 5A, imaged by the TV camera 2, the process is executed to calculate the X-directional locational coordinate 502 of the center of gravity and the Y-directional locational coordinate 503 of the center of gravity of the person 506.

Then, the process is executed to control the electric pan and tilt head 18 on which the TV camera 17 provided with a zoom lens 16 for obtaining a magnified picture, magnify the location where the tracking picture 508 shown in FIG. 5B is inputted, that is, the entering person 506, locate the person in the center of the video monitor 19, and read the vertical and horizontal location data of the electric pan and tilt head 18 when the person is located in the center.

Likewise, the process is executed to derive the coordinates Y505 and X504 of the center of gravity of the person 507 in the lower right corner of the detected picture 501 shown in FIG. 5A and read the vertical and horizontal location data of the electric pan and tilt head 18 at the location where the tracking picture 509 as shown in FIG. 5C is inputted.

The pan and tilt head control coefficient is calculated from the resulting location data of the electric pan and tilt head 18.

The pan and tilt head control coefficient can be obtained by the following expressions (3) and (4).

Horizontal Pan and tilt head Control Coefficient=(Horizontal Location of Pan and tilt head for Obtaining the Picture 509–Horizontal Location of Pan and tilt head for Obtaining the Picture 506)/(X-directional Location Coordinate 504 of the Picture 507–X-directional Location Coordinate 503 of the Picture 506)     (3)

Vertical Pan and tilt head Control Coefficient=(Vertical Location of Pan and tilt head for Obtaining the Picture 509–Vertical Location of Pan and tilt head for Obtaining the Picture 508)/(Y-directional Location Coordinate 505 of the Picture 507–Y-directional Location Coordinate 503 of the Picture 506)     (4)

By multiplying the coefficients derived by the expressions (3) and (4) by the detected location, it is possible to derive the proper location of the electric pan and tilt head corresponding to the detected location of the object, thereby enabling the control for automatic tracking.

Based on the size of the entering object stored in the memory 9, the process 410 of controlling the pan and tilt head allows the pan and tilt head control unit 8 to output a zooming control signal to the zoom lens 16 for changing a focal length, so that the object may be automatically tracked and enlarged into a given size on the video monitor 19.

The focal length of the zoom lens 16 may be controlled on the value derived by the expression (5).

Controlled Focal Length=(Total Number of Pixels in the Y-directional width 307/Y-directional Detected Width 309 of the Detected Object)×(Focal Length×Field Coefficient on Screen 201 where Entering Object Is Detected)     (5)

Here, the Total Number of Pixels is a range of the field of view in Y-direction of the TV camera having a wide field of view.

Note that the expression (5) utilizes the data of the Y direction for calculating the controlled focal length. Alternatively, it may utilize the data of the X direction for the purpose.

However, assuming that the entering object is a person, the Y-directional width 310 is larger than the X-directional width 309. Hence, the data of the Y direction is preferable to controlling the zooming of the lens with respect to the whole of the person.

For the control of the zooming with respect to the face of a person, the electric pan and tilt head may be controlled by a specific value derived by multiplying the Y-directional detection width of the defected object on the memory by a given ratio, adding the multiplied result to the detection location, and multiplying the added result by the value derived by the expressions (3) and (4). For the control, it is possible to use a value derived by multiplying a given ratio by the Y-directional detected width in place of the Y-directional detected width 309 of the detected object on the memory obtained by the foregoing expression (4).

Further, it is possible that the entering object may get out of the tracking screen depending upon the moving speed of the entering object. In that case, the field of view may be widened by adjusting the focal coefficient.

With that, even if the entering object comes closer to the camera from far, the entering object may be imaged while keeping the size of the image at constant.

The foregoing description about the system for processing the tracking picture of the entering object is concerned with the process of enabling the pan and tilt head control unit 8 to output a zooming control signal for controlling the zoom lens 16 and thereby automatically magnifying the image on the screen. Alternatively, the zooming control signal manually controlled by the observer may be inputted to the pan and tilt head control unit 8 through the external I/F 11. This is a manual adjustment of the magnified image.

As set forth above, the system of this embodiment provides a function of controlling the electric pan and tilt head to be vertically and horizontally rotated using the detected and operated data for automatically tracking the entering object and controlling the zoom lens for magnifying the entering object. This function makes it possible for the observer to easily check the entering object on the video monitor.

The prior art entitled "A Procedure for the Analysis of Skiers' Movement with Image Processing Techniques" is arranged to infer the traveling direction of an object from the change of the detected locations of several frames past for deriving the arrows V01 and V02 shown in FIG. 7C and restrict the selection range of the centers of gravity to be connected. This makes it possible to track the target object if two or more objects are located on the screen. However, with this method, it is impossible to precisely track the target object if one object is temporarily split into plural parts or two or more objects are moved in parallel.

The below-described embodiment provides a capability of precisely tracking an object if the object is temporarily split into plural parts or two or more objects are moved in parallel.

Figure 8:
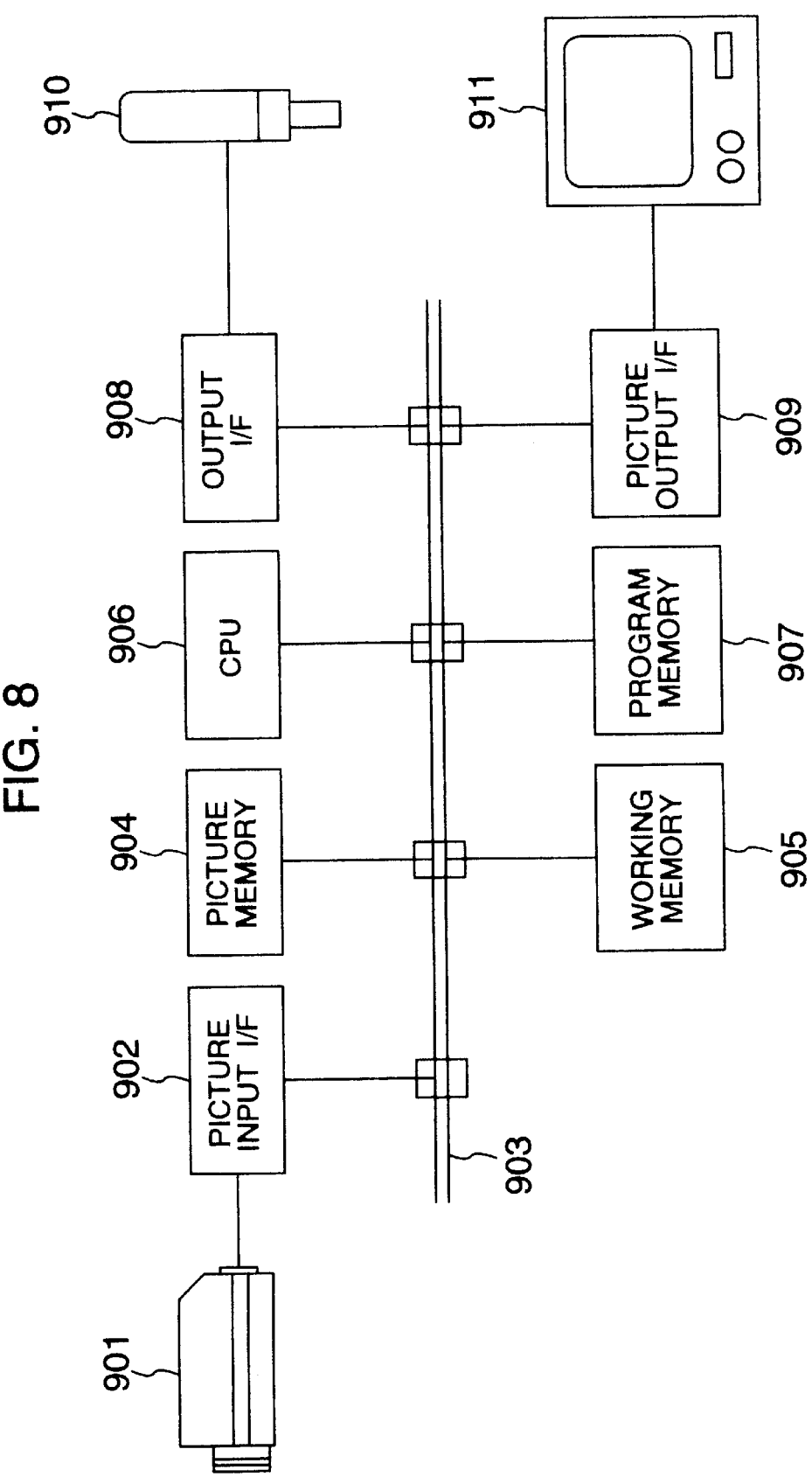
FIG. 8 is a block diagram showing a hardware for implementing one embodiment of the invention.

FIG. 8 is a block diagram showing a hardware arrangement of an object tracking apparatus according to another embodiment of the present invention.

In FIG. 8, a numeral 901 denotes a TV camera. A numeral 902 denotes a picture input interface (I/F). A numeral 903 denotes a data bus. A numeral 904 denotes a picture memory. A numeral 905 denotes a working memory. A numeral 906 denotes a central processing unit (CPU). A numeral 907 denotes a program memory. A numeral 908 denotes an output interface (I/F). A numeral 909 denotes a picture output interface (I/F). A numeral 910 denotes an alarming light. A numeral 911 denotes a monitor. The TV camera 901 is connected to the picture input I/F 902. The alarming light 910 is connected to the output I/F 908. The monitor 911 is connected to the picture output I/F 908. The picture input I/F 902, the picture memory 904, the working memory 905, the CPU 906, the program memory 907, the output I/F 908, and the picture output I/F 909 are all connected to a data bus 903. In FIG. 8, the TV camera 901 operates to image a target area (range of a field of view). The video signal given by the TV camera 901 is sent from the picture input I/F 902 to the picture memory 904 through the data bus 903, in which picture memory 904 the video signal is stored. The CPU 906 operates to analyze the picture stored in the picture memory 904 according to a program stored in the program memory 907. This analysis is executed in the working memory 905. The CPU 906 operates to turn on the alarming light 910 through the output I/F 908 according to the analyzed result and display the picture on the monitor 911 through the picture output I/F 909. The below-described flowcharts will be described along an example of a hardware arrangement of the object tracking apparatus.

Figure 9:
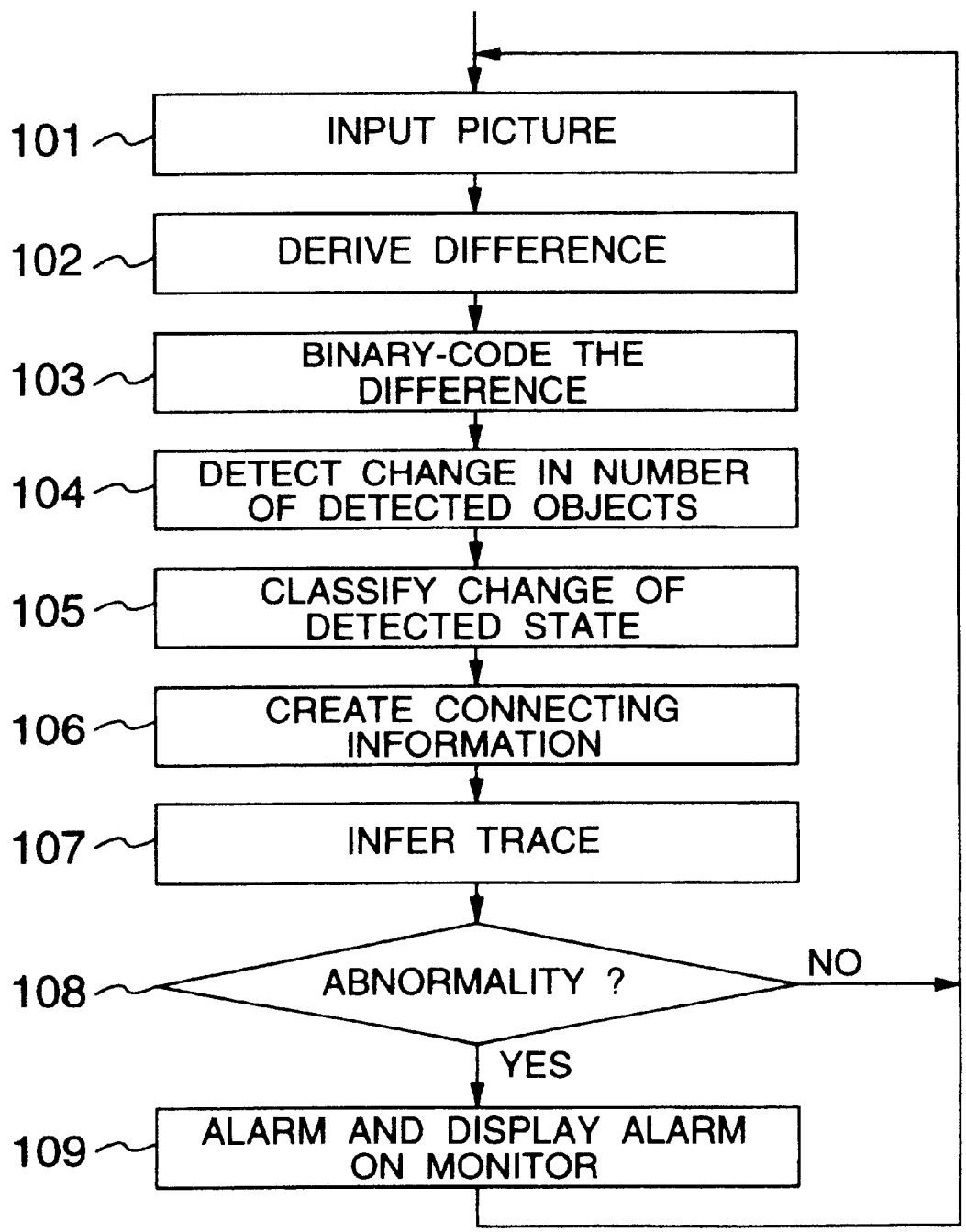
FIG. 9 is a flowchart showing a method for tracking an object according to an embodiment of the invention.

FIG. 9 shows a flowchart on which the present embodiment of the invention is based. At a step 101 of inputting a picture, at a time $t_0+1$, the operation is executed to input an input video signal 701 of a format consisting of 320×240 pixels, for example, given by the TV camera 901 (see FIG. 8) is inputted. At a step 102 of processing a difference, the operation is executed to calculate a difference of each pixel between the input picture and the pre-registered reference background picture 702 (see FIG. 6) with no object to be detected and obtain the difference picture 703 (see FIG. 6) based on the difference. Then, at a binary-coding step 103, the operation is executed to compare the pixels of the difference picture 703 with a given threshold value. Concretely, the pixels whose values are larger than or equal to the threshold value are "255" and the pixels whose values are less than the threshold value are "0". The portion of "255" means an object to be detected, while the portion of "0" means there exists no object to be detected. The resulting picture is the binary-coded image 704 (see FIG. 6). The area D01 of a block of pixels whose luminance values are 255 is extracted by the labelling method known in the field of the art and is specified as the detected object at the time $t_0+1$. The center of gravity of the detected area D01 is specified as the location of the detected object. The "predetermined threshold value" means a value on which it is determined if an object is located with respect to the difference between the input picture and the background picture. It may be set to such a value as disallowing the object to be buried in noises if the picture is binarized on this threshold value. The noises may be removed if they are small in the process of removing the noises and tracking the object after the binary-digitizing process. In actuality, the threshold value depends on the object to be monitored and may have an empirical value set thereto. However, a specific monitoring system may have the luminance value ranging from 20 to 40 in scales of 0 to 255.

Figure 22:
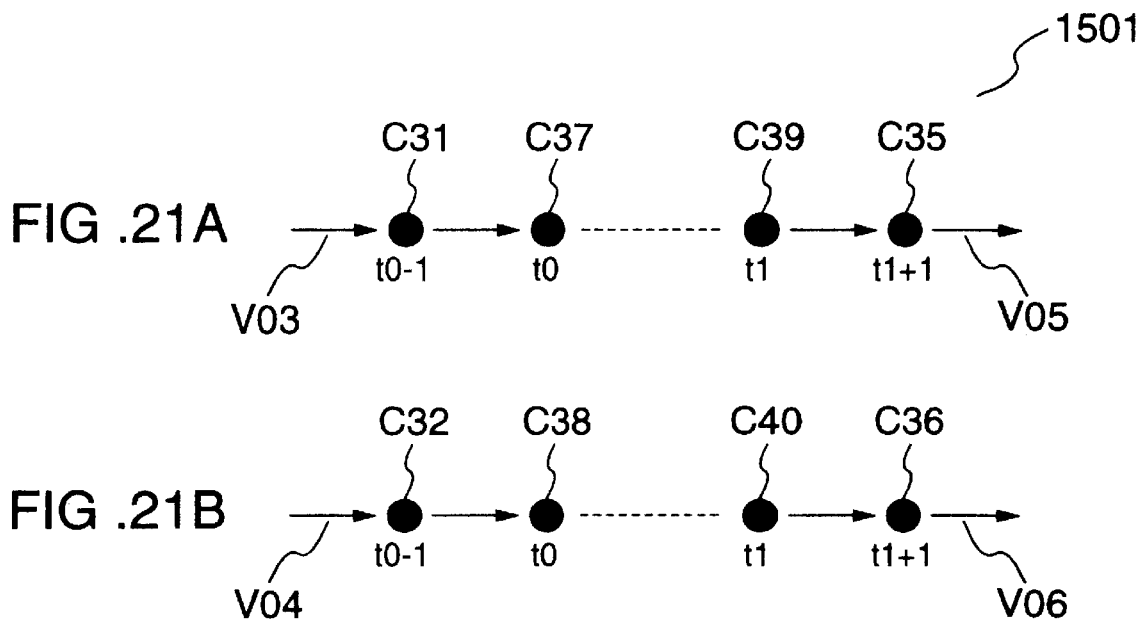
FIG. 22 is a view showing an example of an information content (list structure) stored in a storage area for object information according to the present invention.

Then, the operation is executed to secure an information storage area for the detected object in the working memory 905 (see FIG. 8), in which area are stored the location of the detected object, the area of the detected region, the change of the state, and a set of connecting pointers. FIG. 22 shows an example of an information content (list structure) stored in the storage area. As the object information, the storage area saves detection time, detecting state (appearance, single connection, coupling, disappearance, separation), detection location, area of a detected region, pixel pattern, determined trace, and set of pointers to a connected object. The change of the state and the set of connecting pointers will be described later. Next, at a step 104 of calculating the change of the number of detected objects, the operation is executed to obtain the distance between the location (center of gravity) of the object detected at the time $t_0$ and the location of the object detected at a time $t_0-1$ and the distance between the location at the time $t_0$ and the location of the object detected at a time $t_0+1$. Then, the number of the objects (connectable objects) whose distance is equal to or less than a predetermined value is counted. In the count, the number of objects counted at the time $t_0-1$ is denoted as Np and the number of objects counted at the time $t_0+1$ is denoted as Nn. This process is executed for each object detected at a time $t_0$. The "predetermined value" means a distance on which the objects detected over the continuous frames may be assumed as the same object (connectable object). For example, the value is set to a larger (about double) value depending on the apparent speed of the target object. The reasons for setting it to a larger value is as follows. The representative location of the detected object to be tracked is set as the center of gravity, which means that the representative location does not necessarily indicate a constant portion of the detected object. If it is set to a larger value, the same object is securely connected over the continuous frames. On the other hand, however, the portion detected on the noises may be connected to the object, which brings about difficulty in correcting the trace (determining or correcting splitting) or inferring the trace. If it is too small, the same object may not be connected over the continuous frames. The actual set value depends on the imaging condition and the moving speed of the object. In an experimental system, the predetermined value is set as 40 pix. Assuming that, for example, the TV camera having a ½ type CCD (whose element size is 6.5 mm×4.8 mm) and a focal length of a lens of 25 mm is used for monitoring a target object (whose moving speed is 5 km/h (1.4 m/s) moving horizontally against the imaging plane located 50 m ahead on the picture of 320×240 pix and 0.3 frame/s, the horizontal field of view and the apparent speed are as follows.

Horizontal Field of View: 6.5 mm/25 mm×50 m=13.0 m

Apparent Speed: 1.4 m/s×0.3 s/frame/13.0 m×320 pix= 10.3 pix/frame

The distance considered to allow the object to be connected over the continuous frames is about 20 pix.

At a step 105 of classifying the change of the detecting state, the operation is executed to allocate five detecting states according to the values of Np and Nn of the target object. FIGS. 15A to 15E are explanatory views showing five detecting states for a certain detected object at a time $t_0$. In FIGS. 15A to 15E, a filled circle denotes a location of the detected object, while an empty circle denotes no connectable object located at a time $t_0-1$ or $t_0+1$. In the example 1001 with Np=0 shown in FIG. 15A, an object C04 detected at a time $t_0$ did not exist within the field of view at a time $t_0-1$. This change of state is referred to as "appearance". In the example 1002 with Np=1 shown in FIG. 15B, the object C04 detected at a time to was an object C06 at a time $t_0-1$. This change of state is referred to as "single connection". In the example 1003 with Np>1 shown in FIG. 15B, it is possible that the object C07 detected at a time to may have been an object C08 or an object C09 at a time $t_0-1$. In this example 1003, Np=2 is given. However, it may apply to the case of Np or 3 or more. This change of state is referred to as "coupling". In the example 1004 with Nn=0 shown in FIG. 15D, an object C10 detected at a time to disappeared from within the field of view at a time $t_0+1$. This change of state is referred to as "disappearance". In the example 1005 with Nn>1 shown in FIG. 15E, an object C11 detected at a time $t_0$ may be split or separated to an object C12 and an object C13 at a time $t_0+1$. In this example 1005, Nn=2 is given. However, this example may apply to Nn of 3 or more. This change of state is referred to as "separation". Next, at a step 106 of creating the connecting information, the operation is executed to change a set of connecting pointers in the information storage area of the working memory 905 (see FIG. 8) according to the change of state allocated at the classifying step 105. For the object C05 determined as "single connection" as in the example 1002, the operation is executed to add the detection location of the object C06 to the area for saving the determined trace of the object C05, add an address of the information storage area of the object C06 to the set of connecting pointers of the object C05 and add an address of the information storage area of the object C05 in the working memory 905 to the set of the connecting pointers of the object C06 for specifying the addresses to the next pointer of the object C06. For the object C07 determined as "coupling" as in the example 1003, the operation is executed to add the detection locations of the objects C08 and C09 in the area for saving the determined trace of the object C07 and add an address of the information storage area of the objects C08 and C09 in the working memory 905 to the set of the connecting pointers of the object C07 and an address of the information storage area of the object C07 in the working memory 905 to the sets of connecting pointers of the objects C08 and C09 for specifying the addresses as the next pointers of the objects C08 and C09. For the object C11 determined as "separation as in the example 1005, the operation is executed to add an address of the information storage area of the objects C12 and C13 in the working memory 905 to the set of connecting points of the object C11 and add the detection location of the object C11 and an address of the information storage area of the object C11 to the areas for saving the set traces of the objects C12 and C13. At a step 106 of creating the connecting information, the operation is executed to connect the information storage areas of the detected object in the working memory 905 as a list structure through the set of connecting pointers. Thus, the detected object is classified into at least one of the five state changes and the connecting relation of the detected object on each frame is represented as a list structure.

The times $t_0$, $t_0+1$ and $t_0+2$ . . . are the point in time (intervals of time) when the picture to be process is inputted. The time is set as a length of time which allows at least five frames to be imaged from when a target moving object is entered into the field of view to when it gets out of the field. If the length of time is set as a lower value, the frames for tracking the object is decreased in number, which leads to an obstacle to high-precision tracking. The shorter interval between the times does not matter so much. The set length of time depends on the distance between the camera and the object and the moving speed of the object. In a specific monitoring system, it is set as 2 to 3 frames per second.

Figure 16:
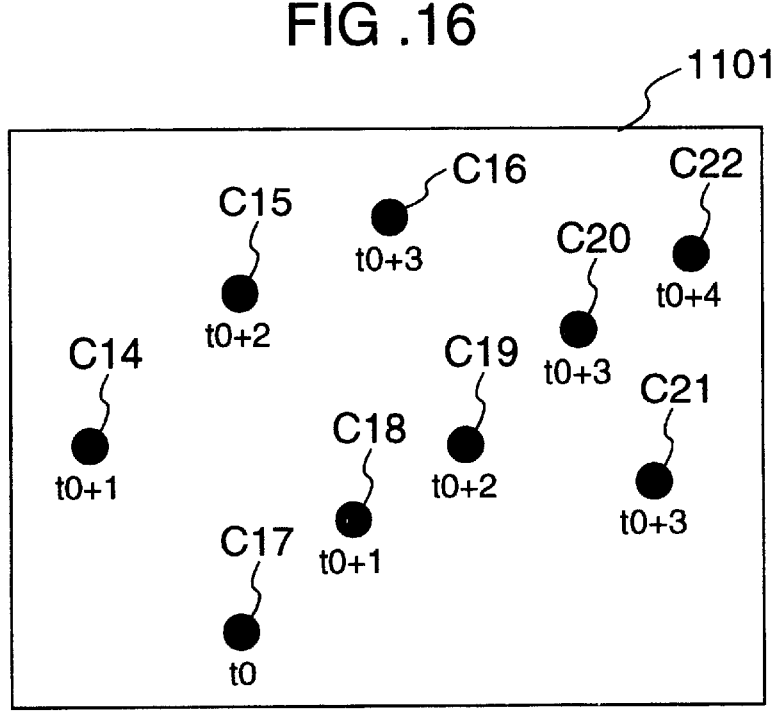
FIG. 16 is an explanatory view showing the connecting information of a detected object used in the present invention.
Figure 17:
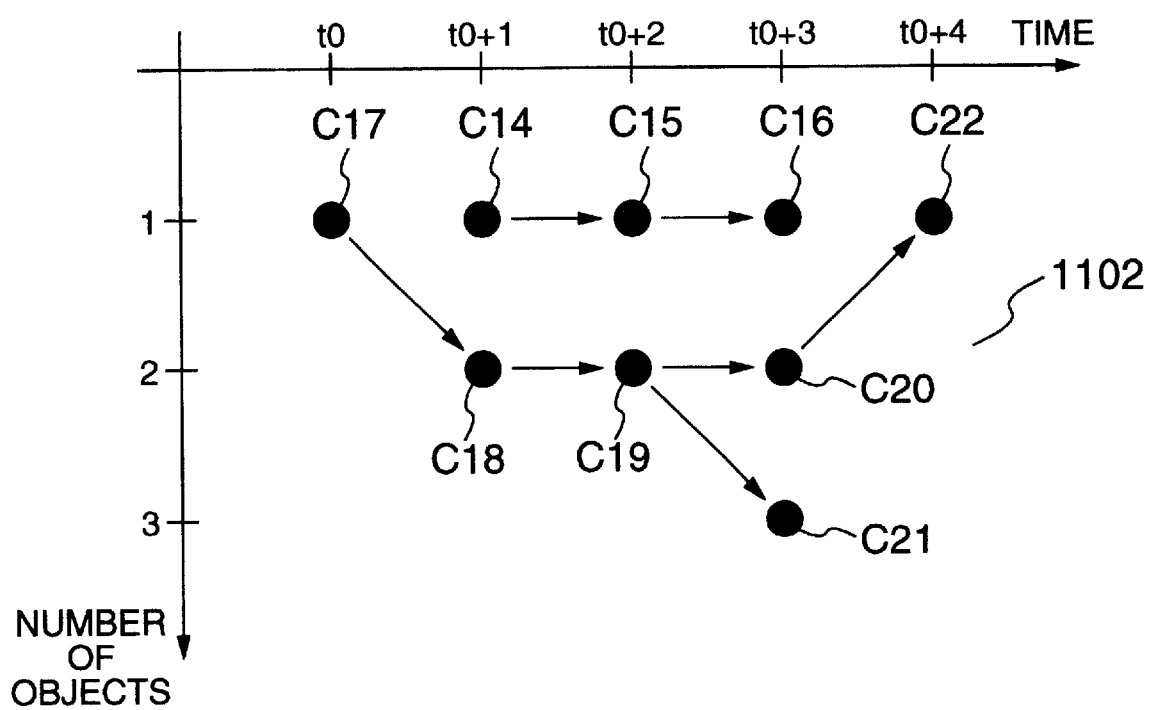
FIG. 17 is an explanatory view showing a list structure shown in FIG. 16.

Now, description will be oriented to the list structure of the object information storage area with reference to FIGS. 16 and 17. FIG. 16 is an explanatory view showing the state of the objects detected between the time to and the $t_0+4$. FIG. 17 shows the connection of the list structure of the detected objects shown in FIG. 16. In FIGS. 16 and 17, the filled circles do not represent an area of a detected binary-coded image but merely denote the detected objects and their locations. In FIG. 16, when the objects detected between the time $t_0$ and the time $t_0+4$ are located as shown by the filled circles, the information storage area of each object is made to be the connected structure as shown in FIG. 17 as a result of the step 104 of calculating the change of the number of detected objects, the step 105 of classifying the change of detection state, and the step 106 of creating the connecting information. For example, looking at the object C19 at the time $t_0+2$ shown in FIG. 16, the objects detected at the time $t_0+3$ immediately after the time are C16, C20 and C21. By obtaining the distance between the object C19 and each of the three objects C18, C20 and C21, the distance between the object C19 and the object C16 is made more than or equal to a predetermined value. Hence, the object C16 is excluded. At the step 104 of calculating the change of the number of the detected objects, the objects C20, C21 are determined as the connectable objects to the object C19. At the step 105 of classifying the change of the detection state, the objects C19 at the time $t_0+2$ and the objects C20 and C21 are classified as "separation". On the other hand, the object C15 detected at the time $t_0+2$ is classified as "coupling" with the object C16 whose distance is more than or equal to the predetermined value. Next, at the step 107 of inferring the trace, the change of the detection location of each object stored in the information storage area is examined retrogressing along the connecting pointers for inferring the trace of the object. For example, the object C22 shown in FIG. 17 may be traced in order of the objects C20, C19, C18 and C17. The trace of the object C22 may be inferred such that it passes through the detection locations of the objects C17, C18, C19, C20 and C22. Next, at a step 108 of determining abnormality, the trace of the object obtained at the step 107 of inferring the trace is estimated by the time and the moving distance. For example, If it is determined if a vehicle is stopped by any fault, it is estimated if the trace of an object within a predetermined time stays within a predetermined range. If it exceeds the predetermined range (the moving distance is large), the process returns to the step 101 of inputting a picture. If it stays within the predetermined range (the moving distance is small), it is determined that the vehicle is stopped by some fault and the process goes to a step 109 of issuing an alarm and displaying an alarm on the monitor.

The predetermined time mentioned above is used for determining if the object is a stopped object (for example, a vehicle). Hence, it may be set to a stopping period of time which allows the vehicle being monitored to be considered as stopping. In an experimental system, it is set as five seconds. That is, if the car is stopped for five seconds, it is determined that it is the stopped card. Further, the predetermined range mentioned above is a maximum moving distance which allows the vehicle to be considered as stopping. For example, it is set as the apparent size of the target object. This is because the detecting process uses the center of gravity of the target object as the representative location, allowing the representative location to fluctuate between the front and the back of the vehicle depending on the detecting state. That is, the position of the target object does not always show a constant point. The set value depends on the imaging condition and the size of the target object. In an experimental system, it is set as about 40×25 pix. In a case that a TV camera having a ½ CCD (whose element size is 6.5 mm×4.8 mm) and a focal length of lens of 25 mm operates to monitor the target object (whose size is assumed as 6.0 m×4.0 m) of 200 m ahead on the screen of 320×240 pix, the horizontal field of view and the apparent size are as follows.

Horizontal Field of View: 6.5 mm/25 mm×200 m=52.0 m

Apparent Size: 6.0 m/520 m×320 pix=36.9 pix

At the step 109 of issuing an alarm sound and displaying an alarm on the monitor, an instruction is given to the output I/F 908 (FIG. 8) and the picture output I/F 909 (FIG. 8). In response to the instruction, the output I/F 908 (FIG. 8)

enables the alarming light 910 (FIG. 8) to be emitted, and the picture output I/F 909 (FIG. 8) enables an abnormal state to be displayed on the monitor 911. According to this embodiment, the object may be tracked while detecting the splitting or coupling of the object on the change of the detecting state.

Figure 23:
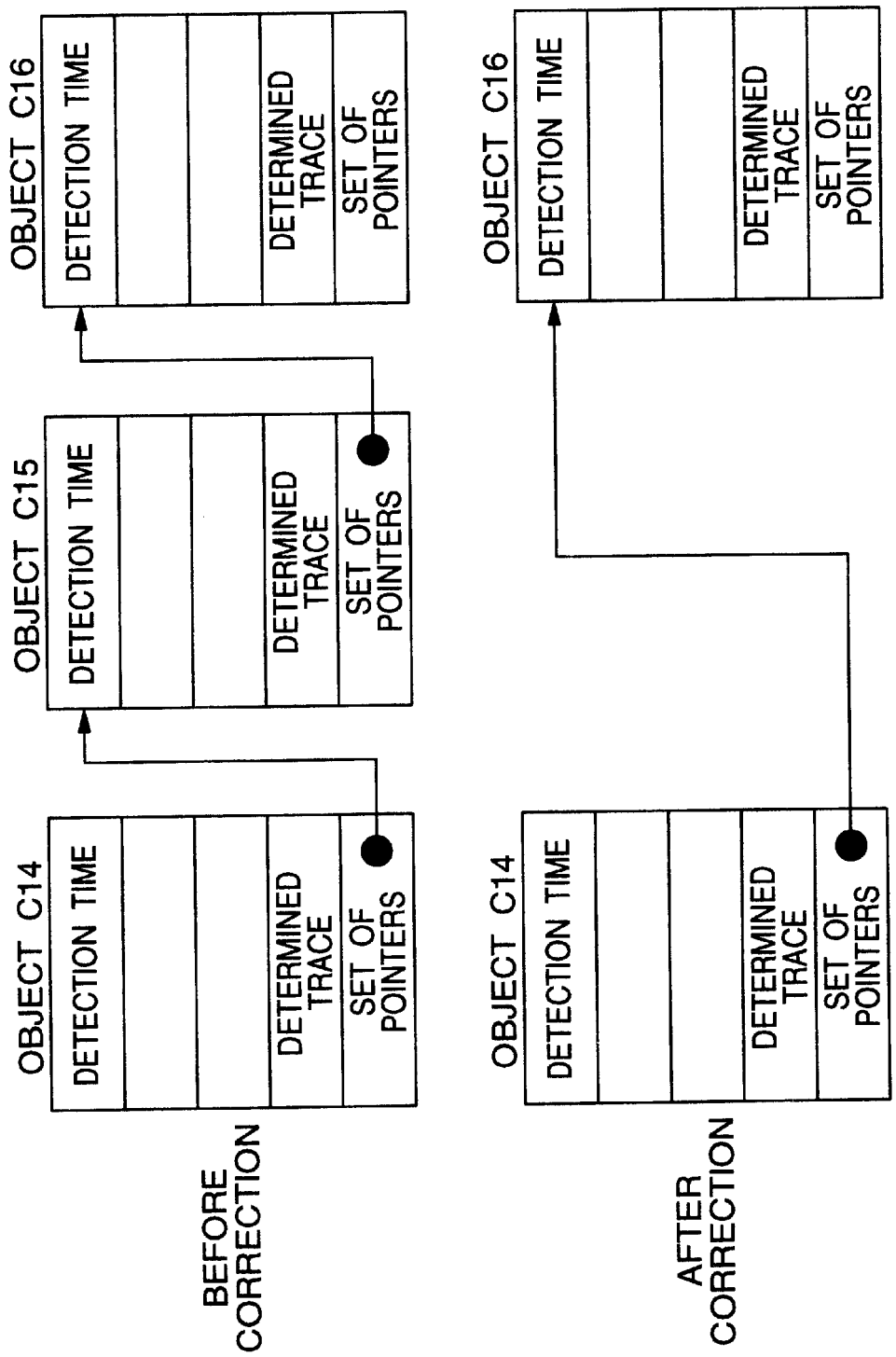
FIG. 23 is a view showing the process of determining a trace of a single-connected object and an example of the corrected list structure according to the present invention.

The objects C14, C15 and C16 shown in FIG. 17 are a set of connecting pointers. It indicates the change of state called "single connection" in the classifications shown in FIGS. 15A to 15E. The method of determining this trace will be described with reference to FIG. 23. FIG. 23 shows an example of determining the trace of the object whose state change is "single connection" and the corrected list structure according to the present invention. In this example, the object C14 shown in FIG. 17 brings about the change of state of single connection". The operation is executed to add the detection location of the object C15 connected in the list structure to the area for saving the determined trace in the object C14, change the pointer of the object C14 pointing to the object C15 to a pointer pointing to the object C16, and lastly delete the connecting information of the object C15.

Here, for indicating a warning state, an alarming light is used. Alternatively, any means such as a sound or vibrations or the combination of them may be used only if an operator or an assistant animal such as a dog may sense it.

Figure 10:
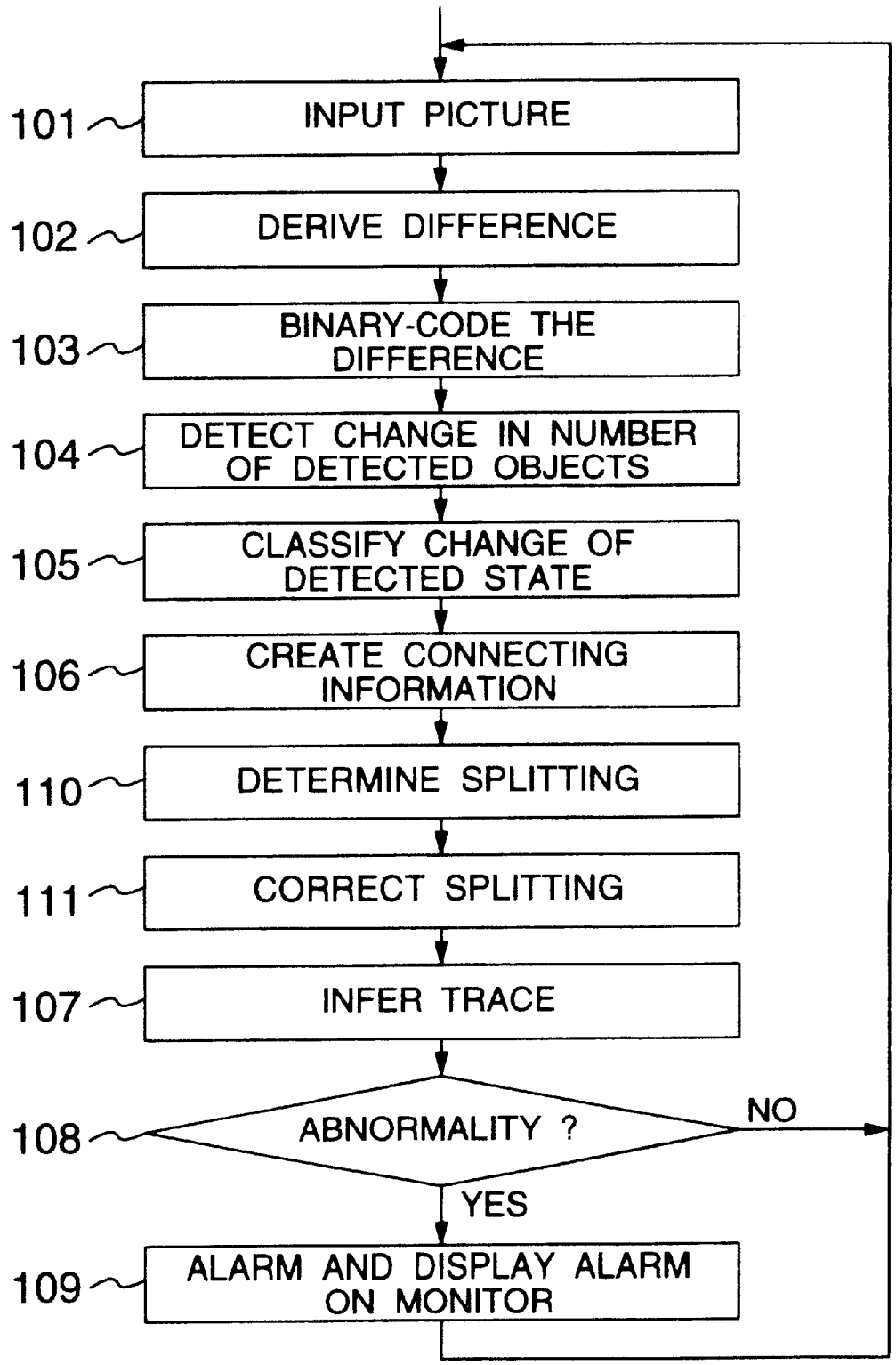
FIG. 10 is a flowchart showing a method for tracking an object according to another embodiment of the invention.
Figure 18:
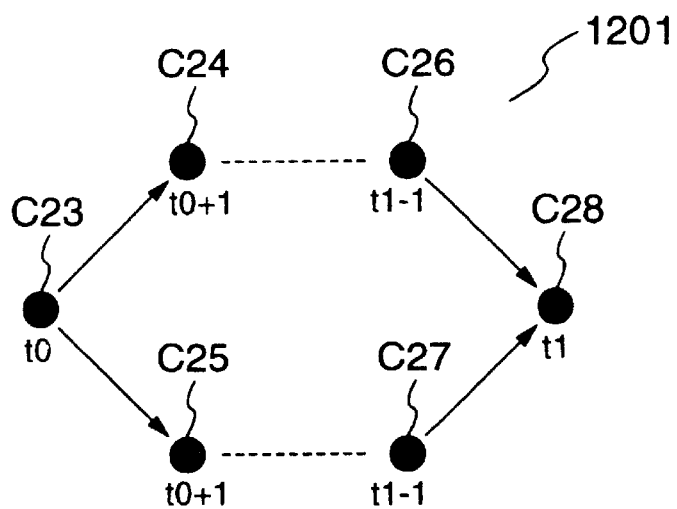
FIG. 18 is an explanatory view showing the process of determining if splitting of an object has occurred in detecting the object according to the present invention.
Figure 19:
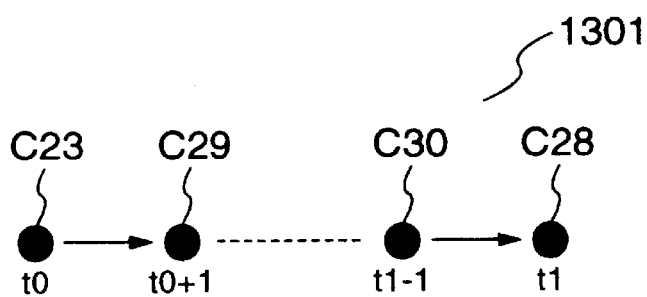
FIG. 19 is an explanatory view showing a connecting status of an object after execution of correction of splitting according to the present invention.

Description will be oriented to another embodiment of the invention with reference to FIGS. 10, 18 and 19. Even in the case of one object imaged by the TV camera being split and detected as a plurality of objects, this embodiment is arranged to trace the object while correcting the splitting state. FIG. 10 shows the flowchart for representing this embodiment. In this flowchart, a step 110 of determining if an object is split and a step 111 of correcting the splitting state are added to the embodiment of FIG. 9. At the step 110 of determining if an object is split, it is determined if the detected object is seemingly split from the change of state of the list structure obtained by the step 106. This determination will be described with reference to FIGS. 18 and 19. FIG. 18 is a connection structure diagram showing a list structure of the detected objects before correcting the splitting state of the object detected between the time $t_0$ and the time $t_0+1$ and between the time $t_1-1$ and the time $t_1$. FIG. 19 is a connection structure diagram showing the state after correcting the splitting state of the detected object shown in FIG. 18. In FIGS. 18 and 19, the filled circle does not denote an area of the detected binary-coded image but merely denotes the location of the detected object or the detected object itself. In FIG. 18, the object C23 indicates the change of state of "separation" at the time $t_0$, which is one of the aforementioned changes of state. At the time $t_1$, the object C28 indicates the change of state of "coupling" after repeating the change of state from the object C23 to the time t1. At the step 110 of determining if an object is split, the operation is executed to determine that the objects C23, C24, C25, . . . , C26, C27 and C28 are "split" parts if the distance between the objects C24 and C25 is larger than or equal to a predetermined maximum size of the object and the sum of the areas of the objects C24 and C25 is equal to or lower than the area of the object C23 with respect to the objects C24 and C25 at the time $t_0+1$ to be connected with the object C23 at the time $t_0$ in the list structure and if the distance between the objects C26 and C27 is equal to or shorter than a predetermined object maximum size and the sum of the areas of the objects C26 and C27 is equal to or lower than the area of the object C28 with respect to the objects C26 and C27 at the time $t_1-1$ to be connected with the object C28 at the time t1 in the list structure. That is, one object C23 at this time $t_0$ is detected as two objects between the times $t_0+1$ and $t_1-1$ by some influence and then these two objects are reunited and detected as one object C28 at the time $t_1$. Note that, like the "predetermined range" described about the determination if the vehicle is stopped, the "predetermined maximum size of the object" may be set to an apparent size of the target object. Like the above case, the value may be set depending on the imaging condition and the size of the target object.

Next, at a step 111 of correcting a splitting state, the operation is executed to create the object information storage areas of the objects C29 and C30 in the working memory 905, produce the detection location of the object C29 by computing a mean location of the detection locations of the objects C24 and C25 weighted by the areas thereof, set the area of the object C30 to be the sum of the areas of the objects C26 and C30, determine the change of state of the object C29 as "single connection", delete addresses of the information storage areas of the objects C24 and C25 in the working memory 905 from the set of connecting pointers of the object C23, and add an address of the information storage area of the object C29 in the working memory 905 to the set of connecting pointers of the object C23. Likewise, the operation is executed to newly create an object information storage area at each time point from the time $t_0+1$ to the time $t_1-1$ in the working memory 905. Then, the detecting states of the objects C23 and C28 are changed to the "simple connection". By this operation, the information storage area and the list structure of the object determined as the splitting state from the time $t_0+1$ to the time $t_1-1$ may be precisely created. In this embodiment, if one object is subjected to splitting and detected as a plurality of object, such is corrected and the object may be precisely tracked.

Figure 11:
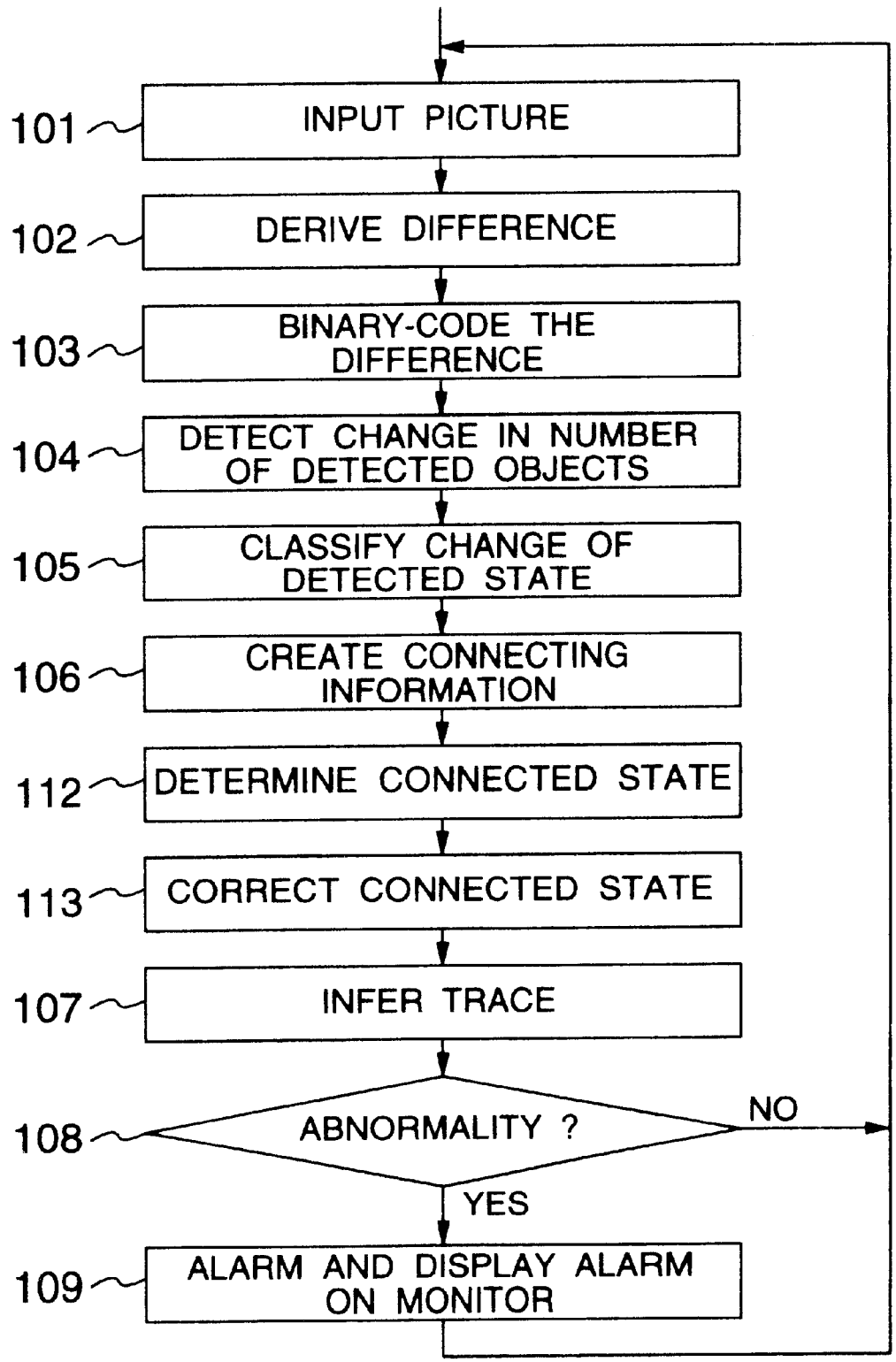
FIG. 11 is a flowchart showing a method for tracking an object according to another embodiment of the invention.
Figure 20:
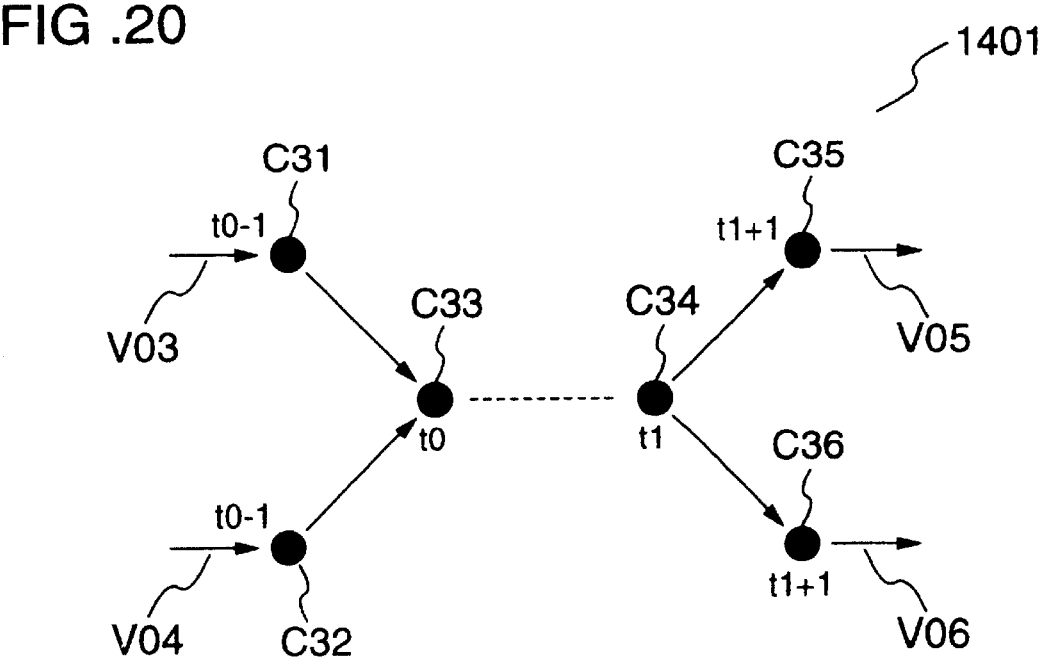
FIG. 20 is an explanatory view showing the process of determining if merging or connection of plural objects has occurred according to the present invention.

Next, description will be oriented to another embodiment of the invention with reference to FIGS. 11, 20, 21A and 21B. This embodiment is arranged such that if two or more objects imaged by the TV camera are connected and detected as one object, the objects may be tracked while correcting the connected state. FIG. 11 is a flowchart for representing this embodiment. In the flowchart of FIG. 11, a step 112 of determining if objects are connected as one and a step 113 of correcting a connected state are added to the embodiment of FIG. 9. At the step 112 of determining if objects are connected as one, it is determined if the detected objects are seen as a connected one from the change of the state of the list structure obtained at the step 106. FIG. 20 is a connecting structure diagram showing the list structure of the detected objects before correcting the connected state of the objects detected from the time $t_0-1$ to the time $t_0$ . . . from the time $t_1$ to the time $t_1+1$. FIGS. 21A and 21*b* are connecting structure diagrams after correcting the connected state of the detected objects shown in FIG. 20. In FIGS. 20, 21A and 21B, a filled circle does not indicate the area of the detected binary-coded image but merely indicates the location of the detected object or the detected object itself. In FIG. 20, the object C33 is in the "connected" state change that is one of the aforementioned state changes at the time $t_0$. Then, the state change is repeated from the times $t_0$ to $t_1$. At the time $t_1$, the object C34 is in the state change of "separation". At the step 112 of determining if the objects are connected, the operation is executed to determine that the objects C31, C32, C33, . . . , C34, C35 and C36 are "connected" if the distance between the objects C31 and C32 is larger than or equal to the predetermined maximum object size and the sum of the areas of the objects C31 and C32 is larger than or equal to the area of the object C33 with respect to the objects C31 and C32 at the time $t_0-1$ to be connected with the object C33 at the time $t_0$ in the list structure and if the distance between the objects C35 and C36 is larger than or equal to the predetermined maximum object size and the sum of the areas of the objects C35 and C36 is larger than or equal to the area of the object C34 with respect to the objects C35 and C36 at the time $t_1+1$ to be connected with the object C34 at the time $t_1$ in the list structure. That is, it is inferred that two objects C31 and C32 at the time $t_1-1$ are detected as a connected state between the time $t_0$ and the time $t_1$ by some influence or other and then at the time $t_1+1$ the connected object is detected to be returned to two objects as the object C28.

Next, at the step 113 of correcting the connected state, the operation is executed to derive an average motion vector V03 of a trace of the object C31 from the time $t_0-N$ to the time $t_0-1$, an average motion vector V04 of a trace of the object C32 from the time $t_0-N$ to the time t0-1, an average motion vector V05 of a trace of the object C35 from the time $t_1+1$ to the time $t_1+N$, and an average motion vector V06 of a trace of the object C36 from the time $t_1+1$ to the time $t_1+N$. If the trace is changed into (x1, y1), (x2, y2), . . . (xN, yN), the motion vector v is calculated by the following expression (6).

$$v = \left( \frac{1}{N} \sum_{i=1}^{N} x_i, \frac{1}{N} \sum_{i=1}^{N} y_i \right) \quad (6)$$

An operation is executed to calculate angles formed between the vectors V3 and V05, V03 and V06, V04 and V05, and V04 and V06 from the calculated average motion vectors and select the combination of the minimum angle as a connection candidate. Further, the combination of the minimum angle from those angles except the previously selected minimum angle is selected as another connection candidate. This process is continued until the combinations of the motion vectors are ended up. The angle θ formed between motion vector v1=(x1, y1) and v2=(x2, y2) is calculated by the following expression (7).

$$\theta = \cos^{-1} \frac{x_1 x_2 + y_1 y_2}{\sqrt{x_1^2 + y_1^2} \sqrt{x_2^2 + y_2^2}} \quad (7)$$

In the examples shown in FIGS. 21A and 21B, the combinations of the average motion vectors V03 and V05 and the average motion vectors V04 and V06 are selected. At the step 113 of correcting the connected state, the operation is executed to newly create the information storage areas of the objects C37, C38, . . . , C39 and C40 as the objects detected at each time point from the time to the time $t_1$, set the detection location of the objects C37 and C38 to that of the object C33 and the detection location of the objects C39 and C40 to that of the object C34. Further, the area of each of the object C37 and C38 is made half as large as the area of the object C33 and the area of each of the object C39 or C40 is made half as large as the area of the object C34. This makes it possible to precisely correct the object information storage areas and the list structure of the objects determined as the connected one from the time t0 to the time $t_1$. The system of this embodiment makes it possible to correct the connected state of plural objects and thereby precisely track the objects even if the objects are detected as a connected one.

Figure 12:
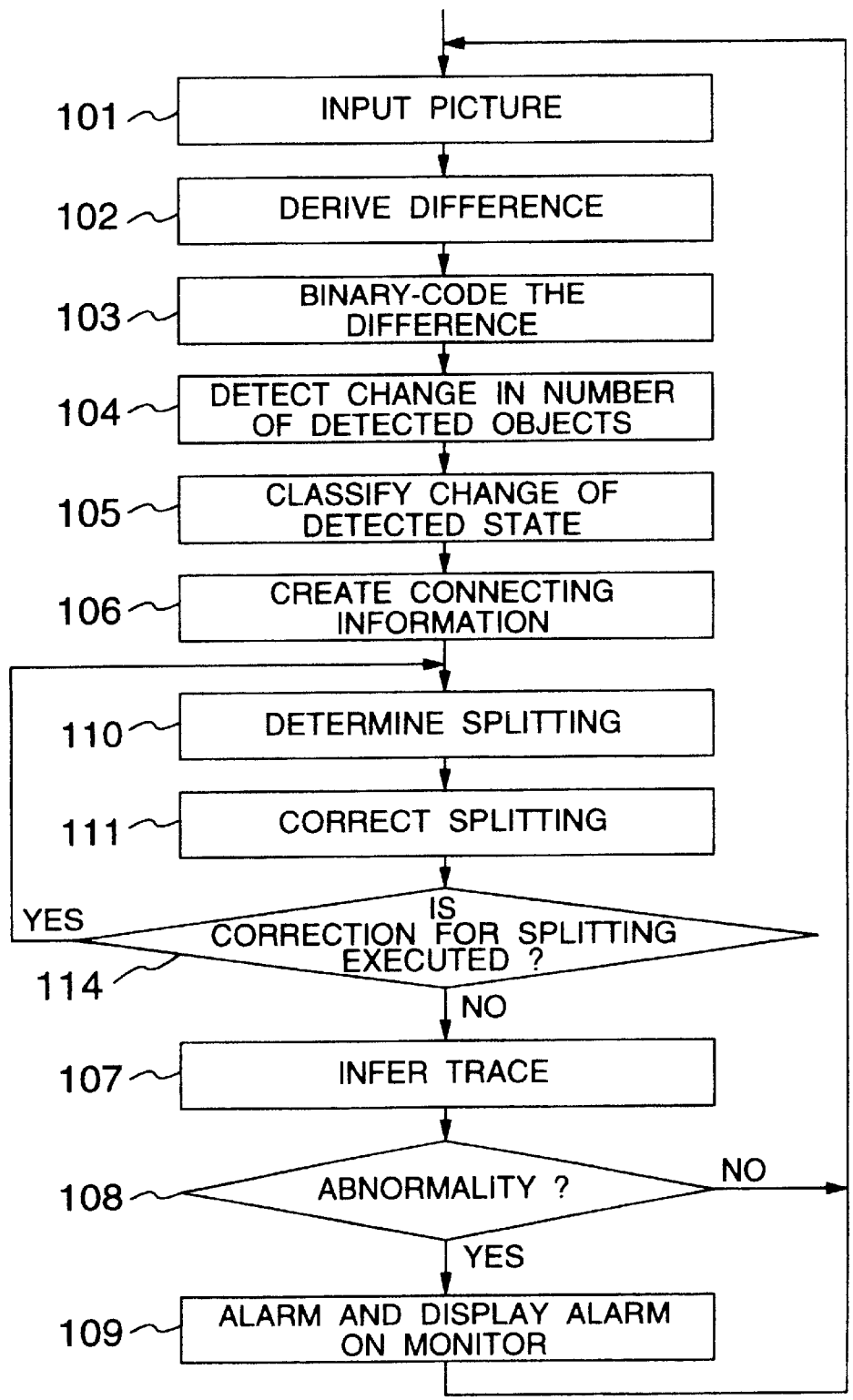
FIG. 12 is a flowchart showing a method for tracking an object according to another embodiment of the invention.

Next, description will be oriented to another embodiment of the invention with reference to the flowchart of FIG. 12. In the embodiment shown in FIG. 12, a recursive determining step 114 of correcting the split state is added to the embodiment shown in FIG. 10. This operation is executed to determine if the split state is corrected. Then, if it is corrected, the operation returns to the step 110 of determining if an object is split and subsequently the split state is again corrected based on the new connecting information after correcting the split state. If no correction is done, the operation goes to the step 107 of inferring the trace. The system of this embodiment makes it possible to correct the split state as long as the correction for the split state can be continued and thereby precisely track the object if two or more objects are split twice or three times and detected as many more objects.

Figure 13:
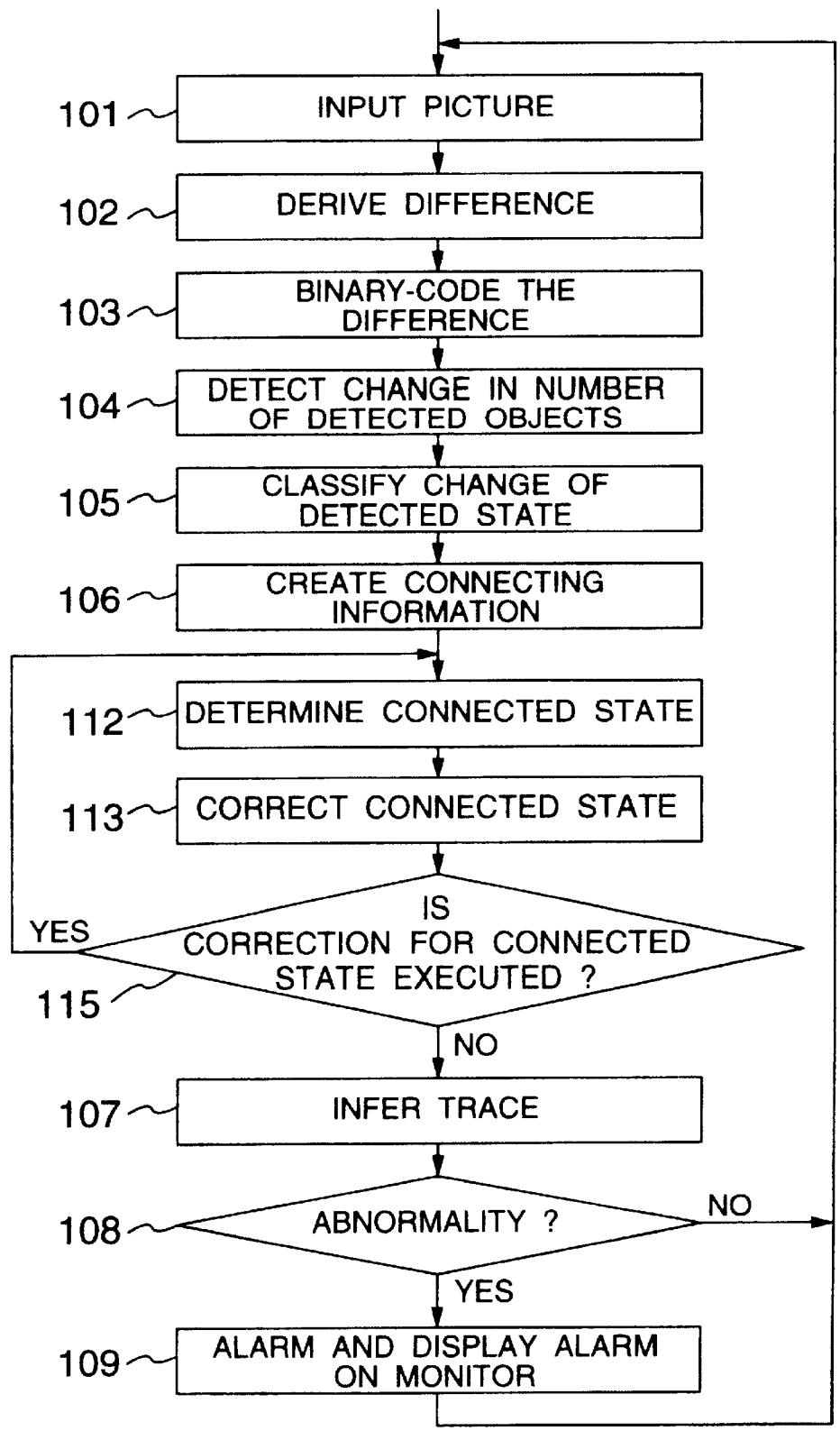
FIG. 13 is a flowchart showing a method for tracking an object according to another embodiment of the invention.
Figure 15A:
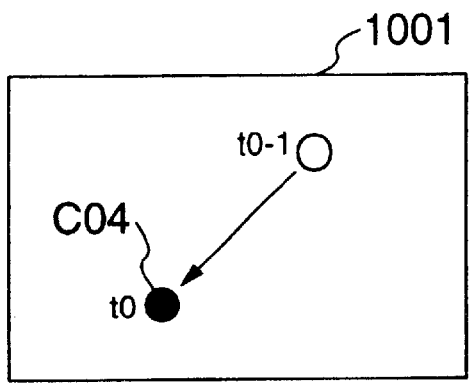
FIGS. 15A to 15E are explanatory views showing a change of a detecting state according to the invention.
Figure 15B:
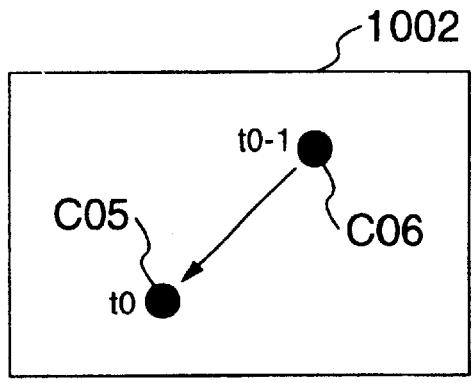
Figure 15C:
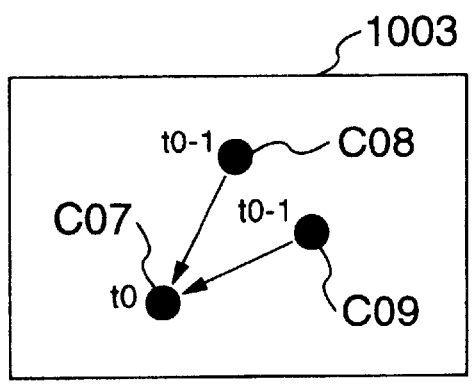
Figure 15D:
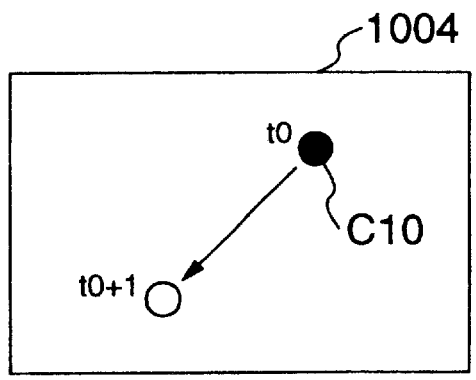
Figure 15E:
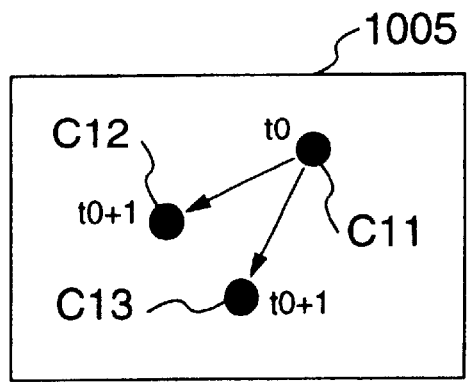

Next, description will be oriented to another embodiment of the invention with reference to the flowchart of FIG. 13. In this embodiment shown in FIG. 13, a recursive determining step 115 of correcting a connected state is added to the embodiment shown in FIG. 11. At this step 115, the operation is executed to determine if the objects have been connected and again correct a connected state based on the new connecting information after the connection is corrected. If no correction for the connected state is executed, the operation goes to the step 107 of inferring the trace. The system of this embodiment makes it possible to correct the connected state as long as the correction can be continued, thereby precisely tracking the object.

Next, description will be oriented to an embodiment of the invention with reference to FIG. 14. This embodiment is a combination of the step 110 for determining if an object is split, the step 111 of correcting a split state, a step 114 of recursively correcting a split state, the step 112 of determining if objects are connected, the step 113 of correcting a connected state, and the step 115 of recursively correcting a connected state. A step 116 of recursively correcting the state is a combination of the step 114 of recursively correcting a split state and the step 115 of recursively correcting a connected state. In the flowchart shown in FIG. 14, at the step 116 of recursively correcting the state, the operation is executed to determine if at least one of the correction for the split state and the correction for the connected state is executed. If correction is done, the operation is returned to the step 110 of determining if the object is split. Then, the operation is executed to correct the split state or the connected state based on the new connecting information after the correction. If no correction for the split state or the connected state is executed, the operation goes to the step 107 of inferring the trace. The system of this embodiment makes it possible to correct the split or the connected state if such phenomena as splitting and connection take place simultaneously and repetitively, thereby precisely track the object.

Of course, steps 110, 111 and 114 in FIG. 12 and steps 112, 113 and 115 in FIG. 13 may be serially implemented in that order or in reverse order.

Figure 24:
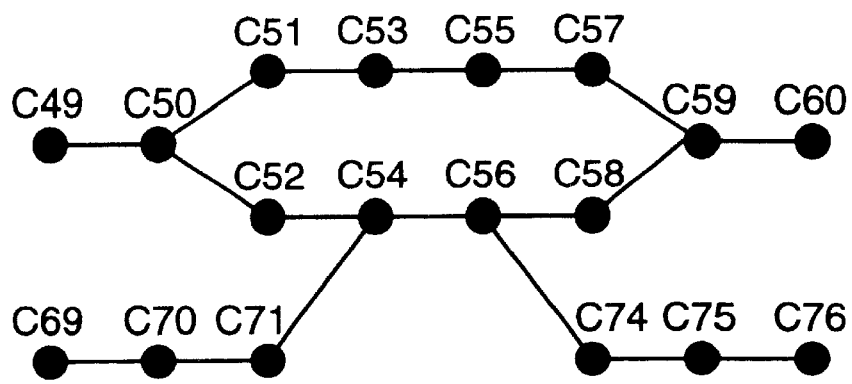
FIG. 24 is an explanatory view showing a step of recursive correction according to the present invention.
Figure 25A:
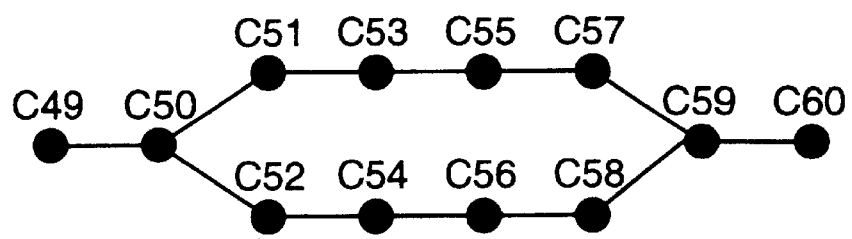
FIGS. 25A and 25B are explanatory views showing a connecting status after the connection occurring in detection as shown in FIG. 24 is corrected.
Figure 25B:
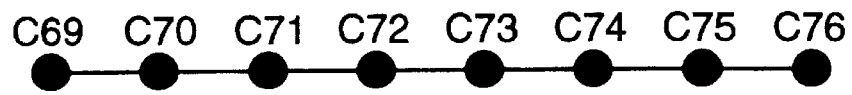
Figure 26A:
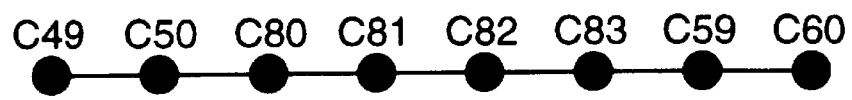
FIGS. 26A and 26B are explanatory views showing a connecting status after the splitting occurring in detection as shown in FIG. 24 is corrected.
Figure 26B:
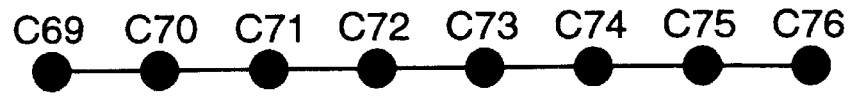

The example that needs the step 116 of recursively correcting the split or the connected state will be described with reference to the connecting structure diagram shown in FIGS. 24, 25A, 25B, 26A and 26B. In these figures, the filled circle does not denote an area of the detected binary-coded image but merely denotes the location of the detected object or the detected object itself. In FIG. 24, the object C50 is separated into the objects C51 and C52 and again connected as the object C59, wherein an intermediately located object C54 is connected with another object C71 and the object C56 is separated into the objects C58 and C74. FIGS. 25A and 25B show the connecting structures after correcting the connected state in the connecting structure shown in FIG. 24. By using calculated motion vectors, the object C54 is corrected into objects C54 and C72 and the object C56 is corrected into the objects C56 and C73. (Note that the word "corrected" means that for example, data of C54 is copied to C72 and C52 supra and C56 onward are linked to C72, while C71 supra and C73 onward are linked to C72.) In this case, it is necessary to correct the split state about the connection from the objects C49 to C60. Hence, at the step 116 of recursively correcting the split or connected state shown in FIG. 14, it is necessary to return to the step 110 of determining if an object is split to repeat the correction. FIGS. 26A and 26B show the connecting structures given by carrying out the correction for the split state at the step 113 of correcting the split state after the process passes through the step 116 and returns to the step 110. In the step 110, C51 and C52 are determined to have been split and C81 is created from C51 and C52. Similarly, it is determined that splitting has occurred between C53 and C54, between C55 and C56 and between C57 and C58 and C81, C82 and C83 are created therefrom, respectively. That is, the objects C51, C53, C55 and C57 and objects C52, C54, C56 and C58 which have been split from the object C50 and then connected at the object C59, are corrected into the objects C80, C81, C82 and C83.

Next, description will be oriented to another embodiment of the present application. The system of this embodiment is arranged so that in the embodiments shown in FIG. 11, 13 or 14, at the step 106 of creating the connecting information, a picture pattern of the detected object is stored as the information of the object and at the step 113 of correcting the connected state, the connected object is corrected base on a similarity derived from a picture pattern matching. The pattern matching is a known technique in the field of the art and is described, for example, in "Introduction to Computer Image Processing" by Tamura, Soken Syuppan, March 1985, pages 148 to 153. At the step 113 of correcting the connected state, the operation is executed to do matching between the objects C31 and C35, C31 and C36, C32 and C35, and C32 and C36 for calculating a similarity of the picture pattern and selecting the combination of the highest similarity as the connection candidate. Further, the operation is executed to select as the next candidate the combination of the highest similarity excepting the foregoing combination selected as the connection candidate. This process is continued until no picture pattern remains. Like the foregoing embodiment, in the example shown in FIGS. 21A and 21B, the combination of C31 and C35 and the combination of C32 and C36 are selected as the connection candidates. At the next step 113 of correcting the connected state, the operation is executed to newly create object information storage areas of the objects C37, C38, . . . , C39, and C40 as the objects detected at each time point from the time to the time $t_1$, set the detection locations of the objects C37 and C38 as that of the object C33, and set the detection locations of the objects C39 and C40 as that of the object C34. Further, the area of each of the object C37 and C38 is made half as large as the area of the object C33. The area of each of the objects C39 and C40 is made half as large as the area of the object C34. This makes -it possible to precisely correct the object information storage area and the list structure of the objects determined to be connected from the time to $t_0$ the time $t_1$. The system of this embodiment makes it possible to correct the connected state of the objects if two or more objects are connected and are detected as one object and thereby precisely track the object.

As set forth above, the system of this embodiment makes it possible to classify the change of the detecting state from the change of the number of the detected objects for the continuous pictures, hold the connecting information about the change of the detecting state, and tracking the detected objects as correcting splitting of one object or the connection of plural objects, thereby implementing more precise tracking. The persons skilled in this art can easily implement the application of the object tracking methods of this embodiment to the system for processing a tracking picture of an entering object described with reference to FIGS. 1, 2A to 2B, 3A to 3G, 4, and 5A to 5B.

The system of this embodiment therefore provides a capability of overcoming a difficulty of precisely tracking each object when two or more objects are located within a field of view of the TV camera such that there are temporarily split objects or a plurality of objects are moving while crossing each other, while widening the application range of the apparatus for tracking and monitoring an object(s).

What is claimed is:

1. A method of tracking and detecting objects entering into an imaging field of view of a camera in an object tracking and monitoring apparatus provided with said camera, comprising the steps of:

sequentially outputting picture signals from said camera;

detecting objects in said picture signals;

detecting changes in the detected objects from said picture signals; and classifying the detected changes in the detected objects into at least one of a plurality of predetermined state changes to be classified include appearance, single connection, coupling, disappearance and separation.

2. The method as claimed in claim 1, further comprising the step of:

detecting said objects to be detected based on classification of said detected changes.

3. The method as claimed in claim 1, further comprising the steps of:

creating connecting information for representing a location and a change of an area of a region of said objects detected at each time from said detected changes; and inferring a trace of said objects by a moving distance of said detected objects from said created connecting information.

4. The method as claimed in claim 3, further comprising the steps of:

determining if one object is split into plural objects when said objects are detected, from said connecting information; and correcting the plural objects determined as a split state into one object.

5. The system as claimed in claim 4, further comprising the step of:

recursively determining if the split state is corrected at said step of correcting the split state, wherein said step of determining the split state and said step of correcting the split state are repeated until no more corrections for the split state are possible.

6. The method as claimed in claim 3, further comprising the steps of:

determining if one object is detected as split objects when said objects are detected, from said connecting information;

correcting plural objects determined as the split state into one object;

determining if plural objects are detected as a connected one object when said object is detected, from said connecting information;

correcting one object determined as the connected state into plural objects from the connecting information before and after said detection; and wherein plural objects determined as the split state are corrected into one object and one object determined as the connected state is corrected into plural objects based on the connecting information before and after said detection.

7. The method as claimed in claim 6, wherein the operation is executed to hold a location of said object, area of a region occupied by said object, and a pixel pattern of said region, detected as the connecting information at said step of creating the connecting information, and the operation is executed to determine the connected state by matching the pixel pattern at said step of determining the connected state.

8. The method as claimed in claim 3, further comprising the steps of:

determining if one object is detected as split plural objects when said plural objects are detected, from said connecting information;

correcting said plural objects determined as the split state into one object;

recursively determining if the correction for the split state is executed at said step of correcting the split state;

determining if plural objects are detected as a connected one object when said one object is detected, from said connecting information;

correcting said one object determined as the connected state into plural objects, based on the connecting information before and after said detection;

recursively determining if the correction for the connected state is executed at said step of correcting the connected state; and wherein said step of determining the split state and said step of correcting the split state are repeated until no more correction for the split state is possible and said step of determining the connected state and said step of correcting the connected state are repeated until no more correction for the connected state is possible.

9. The method as claimed in claim 8, wherein the operation is executed to hold a location of object, area of a region occupied by said object, and a pixel pattern of said region, detected as the connecting information at said step of creating the connecting information and the operation is executed to determine the connected state by matching the pixel pattern at said step of determining the connected state.

10. The method as claimed in claim 1, further comprising the steps of:

creating the connecting information for representing change of a location and area of a region occupied by said objects detected at each time from said detecting state change; and inferring a trace of said objects by a moving distance of said detected objects from said created connected information.

11. The method as claimed in claim 10, further comprising the steps of:

determining if one object is detected as a split state when plural objects are detected, from said connecting information; and correcting said plural objects determined as the split state into one object.

12. The method as claimed in claim 11, further comprising the steps of recursively determining if the correction for the split state is executed at said step of correcting the split state, and wherein said step of determining the split state and said step of correcting the split state are repeated until no more correction for the split state is possible.

13. The method as claimed in claim 10, further comprising the steps of:

determining if plural objects are detected as a connected one object when said one object is detected, from said connecting information; and correcting said one object determined as the connected one object into plural objects, based on said connecting information before and after said detection.

14. The method as claimed in claim 13, further comprising the step of recursively determining if the correction for the connected state is executed at said step of correcting the connected state, and wherein said step of determining the connected state and said step of correcting the connected state are repeated until no more correction for the connected state is possible.

15. The method as claimed in claim 10, further comprising the steps of:

determining if one object is detected as split plural objects when said, plural objects are detected, from said connecting information;

correcting said plural objects determined as the split state into one object;

determining if plural objects are detected as a connected one object when said one object is detected, from said connecting information;

correcting said one object determined as the connected state into plural objects, based on the connecting information before and after said detection; and wherein plural objects determined as the split state is corrected into one object and one object determined as the connected state is corrected into plural objects, based on the connecting information before and after said detection.

16. The method as claimed in claim 15, further comprising the steps of holding a location of said object, area of a region occupied by said object and a pixel pattern of said region, detected as the connecting information at said step of creating the connecting information, and determining the connected state by matching the pixel pattern at said step of determining the connected state.

17. The method as claimed in claim 10, further comprising the steps of:

determining if one object is detected as split plural objects when said plural objects are detected, from said connecting information;

correcting said plural objects determined as the split state into one object;

recursively determining if the correction for the split state is executed at said step of correcting the split state;

determining if plural objects are detected as a connected one object when said one object is detected, from said connecting information;

correcting said one object determined as the connected state into plural objects, based on the connecting information before and after said detection;

recursively determining if the correction for the connected state is executed at said step of correcting the connected state; and wherein said step of determining the split state and said step of correcting the split state are repeated until no more correction for the split state is possible and said step of determining the connected state and said step of correcting the connected step are repeated until no more correction for the connected state is possible.

18. The method as claimed in claim 17, further comprising the steps of holding a location of said object, area of a region occupied by said object and a pixel pattern of said region, detected as the connecting information at said step of creating the connecting information, and determining the connected state by matching the pixel pattern at said step of determining the connected state.

19. The method as claimed in claim 17, further comprising the steps of holding a location of said object, area of a region occupied by said object and a pixel pattern of said region, detected as the connecting information at said step of creating the connecting information, and determining the connected state by matching the pixel pattern at said step of determining the connected state.

20. A system for processing a tracking and monitoring a picture of objects, comprising:
 a first camera for imaging an overall monitoring area and outputting a first picture for detecting said objects entering a given monitoring area;
 a second camera for outputting a picture signal for monitoring a picture to track said objects; and
 a picture processing device for generating a control signal for controlling said second camera based on said first picture signal input from the first camera,
 wherein said picture processing device comprises:
  a detecting unit for detecting changes in the detected objects from said second picture signal; and
  a classifing unit for classifying the detected changes in the detected objects into at least one of a plurality of predetermined state changes including appearance, single connection, coupling, disappearance and separation, and
 wherein said second camera operates to automatically track and image said objects entering into said monitoring area in response to said control signal.

21. The system as claimed in claim 20, wherein said first camera is provided with an imaging lens of a wide field of view, said second camera is provided with a zoom lens, and said second camera is mounted on an electric pan and tilt head, and
 wherein said picture processing device generates a rotation control signal for controlling said electric pan and tilt head signal inputted from said first camera.

22. The system as claimed in claim 21, wherein said picture processing device is served to generate a zooming control signal for zooming said zoom lens by a given amount of from said video signal inputted from said first camera, and said second camera is served to automatically track said object entering said monitoring area and image said object as automatically zooming said lens under the control of said picture processing device.

23. The system as claimed in claim 22, wherein said picture processing device includes a data bus, a central processing unit (CPU), a program memory for saving a program for operating said CPU, picture memories, a working memory, and a pan and tilt head control unit, the latter five of which are connected with said data bus, and
 wherein said CPU operates to generate a picture of said entering object from the video signal inputted from said first camera, save said picture in said picture memory, detect said entering object from said picture, operate the data about said entering object, store the operated data in said working memory, and enable said pan and tilt head control unit to generate said rotation control signal and said zooming control signal based on said operated data.

24. The system as claimed in claim 23, wherein the data operated through the effect of the CPU and stored in said working memory contains a locational coordinate of said entering object.

25. The system as claimed in claim 23, wherein said picture memory contains:
 an input picture memory for storing the video signal inputted from said first camera;
 a background picture memory for storing a background video signal used for detecting said entering object;
 two working memories for storing the input video signal and the background video signal used for doing an operation for detecting a difference between said background picture and said input picture;
 an inter-picture operating result picture memory for storing the detected and operated difference between said background picture and the input picture; and
 a digital picture memory for storing as a picture of said entering object a binary-coded video signal of said detected and operated difference between said background picture and said input picture.

26. The system as claimed in claim 21, wherein said picture processing device includes a data bus, a CPU, a program memory for saving a program for operating said CPU, picture memories, a working memory, and a pan and tilt head control unit, the latter five of which are connected with said data bus, and
 wherein said CPU operates to generate a picture of said entering object from the video signal inputted from said first camera, store the video signal in said picture memory, detect said entering object from said picture, operate data about said intruded object, store said operated data in said working memory, and enable said pan and tilt head control unit to generate said rotation control signal based on said operated data.

27. The system as claimed in claim 26, wherein the data operated through the effect of the CPU and stored in said working memory contains a locational coordinate of said entering object.

28. The system as claimed in claim 26, wherein said picture memory contains:
 an input picture memory for storing the video signal inputted from said first camera;
 a background picture memory for storing a background video signal used for detecting said entering object;
 two working memories for storing the input video signal and the background video signal for carrying out an operation for detecting a difference between the background picture and the in put picture;
 an inter-picture operation result picture memory for storing the detected and operated difference between said background picture and said input picture; and
 a binary-coded picture memory for storing as a picture of said entering object a binary-coded image signal of said detected and operated difference between said background picture and said input picture.

29. The method as claimed in claim 28, further comprising the steps of:
 determining if plural objects are connected as one object when said objects is detected, from said connecting information; and
 correcting one object determined as a connected state into plural objects based on the connecting information before and after the detection.

30. The method as claimed in claim 29, further comprising the step of:
  recursively determining if the correction for the connected state is executed at said step of correcting the connected state,
  wherein said step of determining the connected state and said step of correcting the connected state are repeated until no more corrections for the connected state are possible.

31. The method as claimed in claim 30, wherein the operation is executed to hold a location of said object, area of a region occupied by said object, and a pixel pattern of said region, detected as the connecting information at said step of creating the connecting information, and the operation is executed to determine the connected state by matching the pixel pattern at said step of determining the connected state.

* * * * *